United States Patent
Sakamoto et al.

(10) Patent No.: US 9,631,845 B2
(45) Date of Patent: Apr. 25, 2017

(54) HEAT PUMP SYSTEM USING WASTE HEAT AND HEAT ENGINE-DRIVEN VAPOR COMPRESSION HEAT PUMP SYSTEM

(71) Applicant: Panasonic Intellectual Property Management Co., Ltd., Osaka (JP)

(72) Inventors: Naoki Sakamoto, Osaka (JP); Takeshi Ishii, Osaka (JP); Hiroshi Mukaiyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 99 days.

(21) Appl. No.: 14/769,066

(22) PCT Filed: Feb. 5, 2014

(86) PCT No.: PCT/JP2014/000615
§ 371 (c)(1),
(2) Date: Aug. 19, 2015

(87) PCT Pub. No.: WO2014/129135
PCT Pub. Date: Aug. 28, 2014

(65) Prior Publication Data
US 2016/0003504 A1    Jan. 7, 2016

(30) Foreign Application Priority Data

Feb. 20, 2013 (JP) .................................. 2013-031440
Feb. 20, 2013 (JP) .................................. 2013-031441
(Continued)

(51) Int. Cl.
*F25B 27/00* (2006.01)
*F25B 25/02* (2006.01)
(Continued)

(52) U.S. Cl.
CPC .............. *F25B 25/02* (2013.01); *F25B 13/00* (2013.01); *F25B 15/00* (2013.01); *F25B 27/02* (2013.01);
(Continued)

(58) Field of Classification Search
CPC . F25B 27/02; F25B 13/00; F25B 7/00; Y02B 30/62; F25D 16/00
(Continued)

(56) References Cited

U.S. PATENT DOCUMENTS 5,586,442 A * 12/1996 Nicodemus ............... F04F 5/00
417/173
2003/0188544 A1 * 10/2003 Yamasaki ................. F25B 1/10
62/238.1
(Continued)

FOREIGN PATENT DOCUMENTS

CN    1549913 A    11/2004
CN    1740704 A    3/2006
(Continued)

OTHER PUBLICATIONS

International Search Report PCT/JP2014/000615 dated May 20, 2014 with English translation.
(Continued)

*Primary Examiner* — Melvin Jones
(74) *Attorney, Agent, or Firm* — McDermott Will & Emery LLP

(57) ABSTRACT

A heat pump system using waste heat has a compression heat pump circuit that uses the shaft output of a power engine as a power source for a compressor for compressing refrigerant, and an absorption heat pump circuit using waste heat of the power engine as a heat source for a regenerator for heating absorbing liquid, refrigerant vaporized in the compression heat pump circuit is circulated to an absorber of the
(Continued)

absorption heat pump circuit, the refrigerant is separated after regenerated by the regenerator, and the separated refrigerant is circulated in the compression heats pump circuit. The absorption heat pump circuit has a reverse pump R in a return pipe for absorbing liquid from the regenerator to the absorber, and the rotation energy of the reverse pump R can be withdrawn by a circulation pump P for the absorbing liquid.

13 Claims, 13 Drawing Sheets

(30) Foreign Application Priority Data

| Feb. 20, 2013 | (JP) | 2013-031442 |
| Feb. 20, 2013 | (JP) | 2013-031443 |
| Feb. 20, 2013 | (JP) | 2013-031444 |

(51) Int. Cl.
| F25B 15/00 | (2006.01) |
| F25B 27/02 | (2006.01) |
| F25B 13/00 | (2006.01) |
| F25B 29/00 | (2006.01) |
| F25B 30/06 | (2006.01) |
| F25B 5/04  | (2006.01) |
| F25B 6/04  | (2006.01) |
| F25B 40/00 | (2006.01) |

(52) U.S. Cl.
CPC .......... *F25B 29/003* (2013.01); *F25B 29/006* (2013.01); *F25B 30/06* (2013.01); *F25B 5/04* (2013.01); *F25B 6/04* (2013.01); *F25B 40/00* (2013.01); *Y02B 30/625* (2013.01)

(58) Field of Classification Search
USPC .............................. 62/238.3, 324.6, 332, 335
See application file for complete search history.

(56) References Cited

U.S. PATENT DOCUMENTS

| 2005/0011209 A1 | 1/2005 | Sawada et al. |
| 2007/0019708 A1 | 1/2007 | Shiflett et al. |
| 2010/0257879 A1 | 10/2010 | Shiflett et al. |

FOREIGN PATENT DOCUMENTS

| CN | 101175953 A | 5/2008 |
| DE | 4415199 A1 | 11/1995 |
| JP | 56-20968 A | 2/1981 |
| JP | 57-73370 A | 5/1982 |
| JP | 59-122784 A | 7/1984 |
| JP | 6-2981 A | 1/1994 |
| JP | 7-280398 A | 10/1995 |
| JP | 8-21671 A | 1/1996 |
| JP | 11-337216 A | 12/1999 |
| JP | 2000-035251 A | 2/2000 |
| JP | 2004-286240 A | 10/2004 |
| JP | 2006-250462 A | 9/2006 |
| JP | 2010-096429 A | 4/2010 |

OTHER PUBLICATIONS

International Preliminary Report on Patentability PCT/JP2014/000615 dated Sep. 3, 2015 with English translation.
Notification of Reasons for Refusal Japanese Patent Application No. 2013-031442 dated Aug. 23, 2016 with English translation.
Notification of Reasons for Refusal Japanese Patent Application No. 2013-031443 dated Aug. 23, 2016 with English translation.
Notification of Reasons for Refusal Japanese Patent Application No. 2013-031440 dated Aug. 30, 2016 with English translation.
Office Action dated Oct. 26, 2016, issued in related Chinese Patent Application No. 201480009532.X, with English language translation.

\* cited by examiner

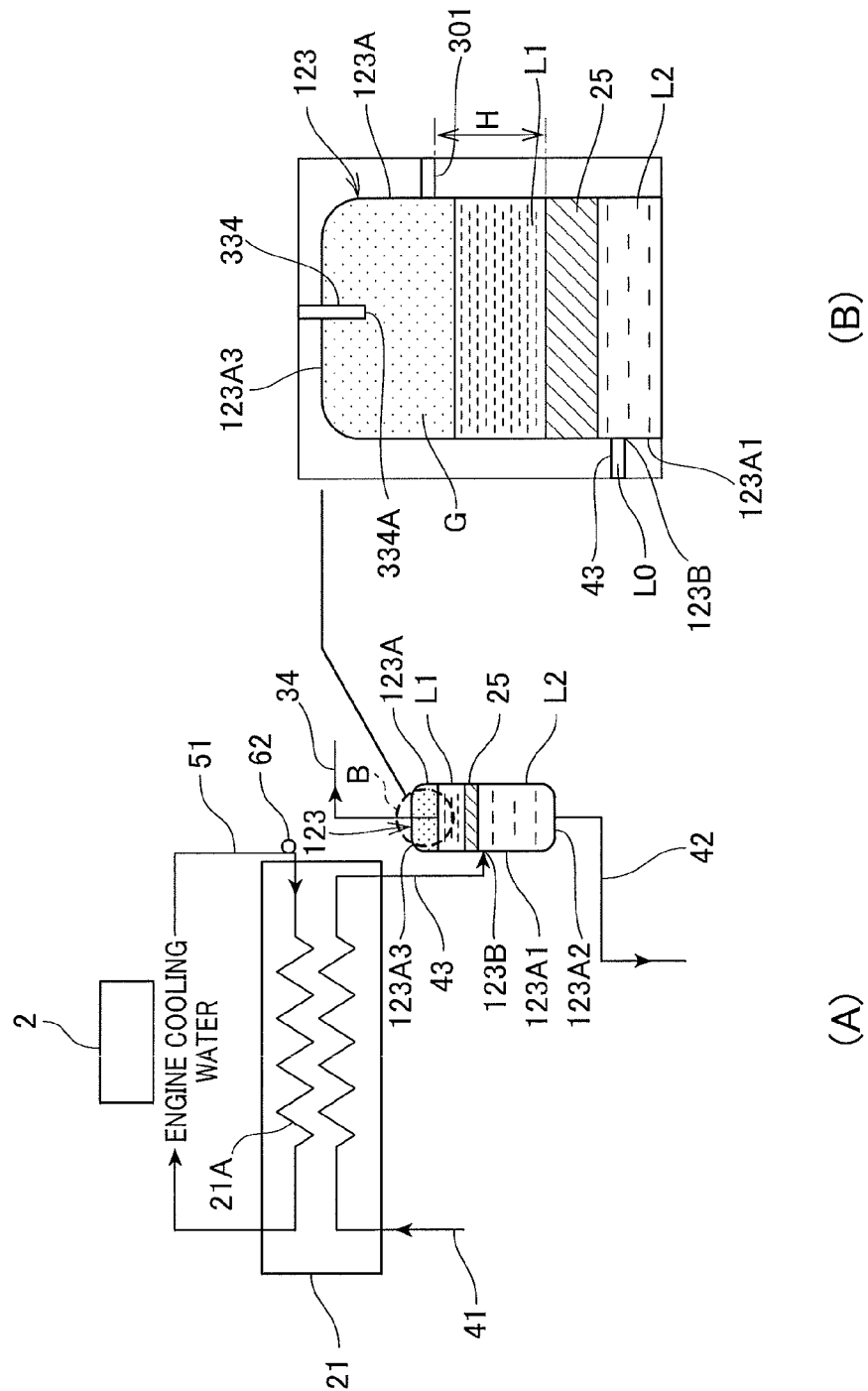

HEAT PUMP SYSTEM USING WASTE HEAT AND HEAT ENGINE-DRIVEN VAPOR COMPRESSION HEAT PUMP SYSTEM

CROSS-REFERENCE TO RELATED APPLICATIONS

This application is the U.S. National Phase of PCT/JP2014/000615 filed Feb. 5, 2014, which claims priority to Japanese Patent Application No. 2013-031440 filed Feb. 20, 2013, Japanese Patent Application No. 2013-031441 filed Feb. 20, 2013, Japanese Patent Application No. 2013-031442 filed Feb. 20, 2013, Japanese Patent Application No. 2013-031443 filed Feb. 20, 2013, and Japanese Patent Application No. 2013-031444 filed Feb. 20, 2013. The subject matter of each is incorporated herein by reference in entirety.

TECHNICAL FIELD

The present invention relates to a heat pump system using waste heat and a heat engine-driven vapor compression heat pump system that respectively have a compression heat pump circuit and an absorption heat pump circuit.

BACKGROUND ART

There is known a heat pump system using waste heat that has a compression heat pump circuit using the shaft output of a power engine as a power source for a compressor which compresses refrigerant, and an absorption heat pump circuit using waste heat of the power engine as a heat source for a regenerator which heats absorbing liquid (see Patent Document 1, for example). In this heat pump system using waste heat, refrigerant passing through a use-side heat exchanger of the compression heat pump circuit is circulated to an absorber of the absorption heat pump circuit, separated after regenerated by the regenerator, and supplied to the discharge side of the compressor of the compression heat pump circuit.

PRIOR ART

Patent Document

Patent Document 1: JP-A-2010-96429

SUMMARY OF THE INVENTION

Problem to be Solved by the Invention

Energy saving has been required to the conventional heat pump system using waste heat as described above.

The present invention has been implemented in view of the foregoing circumstances, and has an object to provide a heat pump system using waste heat and a heat engine-driven vapor compression heat pump system that are respectively configured to perform energy saving.

Means of Solving the Problem

In order to attain the above object, a heat pump system using waste heat according to the present invention, comprises: a compression heat pump circuit using a shaft output of a power engine as a power source for a compressor that compresses refrigerant; and an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, the absorption heat pump circuit has a reverse pump in a return pipe for the absorbing liquid from the regenerator to the absorber, and rotational energy of the reverse pump is enabled to be withdrawn by a circulation pump for the absorbing liquid.

In the above construction, the circulation pump and the reverse pump may be equipped with a common rotating shaft.

In the above construction, a displacement volume $V_r$ of the reverse pump may satisfy the following equation with respect to a displacement volume $V_p$ of the circulation pump:

$$V_p \times n \times \rho_p \times x_p = V_r \times n \times \rho_r \times x_r + m_{comp}$$

wherein n represents the rotation number of the rotating shaft, $\rho_p$ represents the density of absorbing liquid passing through the circulation pump, $x_p$ represents the mass concentration of the refrigerant in the absorbing liquid passing through the circulation pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump circuit.

In the above construction, the circulation pump and/or the reverse pump may have a varying mechanism for varying a displacement volume thereof, and the varying mechanism varies the displacement volume of the target pump so as to satisfy the following equation:

$$V_p \times n \times \rho_p \times x_p = V_r \times n \times \rho_r \times x_r + m_{comp}$$

Wherein $v_p$ represents the displacement volume of the circulation pump, n represents the rotation number of the rotating shaft, $\rho_p$ represents the density of absorbing liquid passing through the circulation pump, $x_p$ represents the mass concentration of the refrigerant in the absorbing liquid passing through the circulation pump, $v_r$ represents the displacement volume of the reverse pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump.

In the above construction, the reverse pump may be connected to the circulation pump through a transmission that varies the ratio $(n_p/n_r)$ of rotation numbers of the circulation pump and the reverse pump so as to satisfy the following equation (2):

$$V_p \times n_p \times \rho_p \times x_p = V_r \times n_r \times \rho_r \times x_r + m_{comp}$$

wherein $V_p$ represents the displacement volume of the circulation pump, $n_p$ represents the rotation number of the circulation pump, $\rho_p$ represents the density of absorbing liquid passing through the circulation pump, $x_p$ represents the mass concentration of the refrigerant in the absorbing liquid passing through the circulation pump, $V_r$ represents the displacement volume of the reverse pump, $n_r$ represents the rotation number of the reverse pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump circuit.

In the above construction, the refrigerant regenerated by the regenerator of the absorption heat pump circuit may be supplied to a suction port of the compressor of the compression heat pump circuit.

A heat pump system using waste heat according to the present invention, comprises: a compression heat pump circuit using a shaft output of a power engine as a power source for a compressor that compresses refrigerant; and an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, and a suction-side refrigerant heat withdrawer for performing heat-exchange between refrigerant to be supplied to the compressor and absorbing liquid to be supplied to the regenerator.

In the above construction, a branch pipe that is branched from an absorbing liquid feeding pipe from the absorber to the regenerator may be provided, and the suction-side refrigerant heat withdrawer may be provided to the branch pipe.

In the above construction, a discharge-side refrigerant heat withdrawer for performing heat-exchange between refrigerant discharged from the compressor and absorbing liquid to be supplied to the regenerator may be provided.

In the above construction, the refrigerant regenerated by the regenerator of the absorption heat pump circuit may be supplied to a suction port of the compressor of the compression heat pump circuit.

A heat pump system using waste heat according to the present invention, comprises: a compression heat pump circuit using a shaft output of a power engine as a power source for a compressor that compresses refrigerant; and an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, and lubrication oil for the compressor of the compression heat pump circuit and the absorbing liquid of the absorption heat pump circuit are the same liquid.

In the above construction, absorbing liquid supply means that supplies the absorbing liquid of the absorption heat pump circuit as lubrication oil for the compressor may be provided.

In the above construction, refrigerant regenerated by the regenerator of the absorption heat pump circuit may be supplied to a suction port of the compressor of the compression heat pump circuit.

A heat pump system using waste heat according to the present invention, comprises: a compression heat pump circuit using a shaft output of a power engine as a power source for a compressor that compresses refrigerant; and an absorption heat pump circuit using waste heat of the power engine as a heat source for a regenerator that heats absorbing liquid, wherein refrigerant vaporized in the compression heat pump circuit is circulated to an absorber of the absorption heat pump circuit, a separator for separating lubrication oil for the compressor and the refrigerant from the absorbing liquid of the absorption heat pump circuit is provided at an exit of the regenerator, and the lubrication oil for the compressor and the refrigerant which are separated by the separator are circulated in the compression heat pump circuit.

In the above construction, the lubrication oil for the compressor and the refrigerant that are separated by the separator may be supplied to a suction port of the compressor of the compression heat pump circuit.

In the above construction, the separator may have a main body in which mixture liquid comprising lubrication oil from the regenerator, refrigerant vapor and absorbing liquid flows, and separation means for separating the absorbing liquid and the lubrication oil may be provided in the main body to separate the mixture liquid into three layers of the refrigerant vapor, the lubrication oil and the absorbing liquid.

In the above construction, a mixture liquid pipe to which the mixture liquid from the regenerator is supplied may be connected to an intermediate portion in an up-and-down direction of the main body, and the separating means may be disposed at an upper side of a connection portion between the main body and the mixture liquid pipe.

In the above construction, a refrigerant pipe for supplying the refrigerant to the compression heat pump circuit may be connected to an upper portion of the main body, and the refrigerant pipe may extend to the inside of the main body, and have a curved portion that is curved in a substantially U-shape with the tip thereof placed face up.

A heat engine-driven vapor compression heat pump system according to the present invention comprises: a compression heat pump circuit using a shaft output of a power engine as a power source for a compressor that compresses refrigerant; and an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, refrigerant regenerated by the regenerator of the absorption heat pump circuit is supplied to a suction port of the compressor of the compression heat pump circuit, and a temperature sensor for detecting the temperature of waste heat to be supplied to the regenerator and waste heat temperature control means for controlling a circulation pump for the absorbing liquid so that the temperature of the waste heat detected by the temperature sensor is kept to a predetermined temperature are provided.

In the above construction, a bypass pipe through which refrigerant vaporized in the compression heat pump circuit bypasses the absorption heat pump circuit and is supplied to a suction port of the compressor may be provided, a bypass valve for controlling a refrigerant amount may be provided to the bypass pipe, and the waste heat temperature control means controls the bypass valve on the basis of the temperature of the waste heat detected by the temperature sensor.

In the above construction, heat capacity amount control means for controlling heat capacity of cold heat or hot heat to be supplied from a user-side heat exchanger of the compression heat pump circuit to a thermal load may be provided, and the heat capacity control means may reduce an input variation of a power source of the power engine by only the amount corresponding to a capacity contribution rate of the absorption heat pump circuit to the whole capacity of the heat engine-driven vapor compression heat pump system.

The specification contains the whole contents of Japanese Patent Applications no. 2013-031440, 2013-031441, 2013-031442, 2013-031443 and 2013-031444 filed on Feb. 20, 2013.

Effect of the Invention

According to the present invention, the absorption heat pump circuit has the reverse pump in the return pipe for the absorbing liquid from the regenerator to the absorber, and the rotational energy of the reverse pump can be withdrawn by the circulation pump for the absorbing liquid. Therefore, energy saving of the circulation pump can be performed, and further energy saving of the heat pump system using waste heat can be performed.

Furthermore, according to the present invention, the suction-side refrigerant heat withdrawer for performing the heat-exchange between the refrigerant to be supplied to the compressor and the absorbing liquid to be supplied to the regenerator is provided. Therefore, the heat of the refrigerant vapor to be supplied to the compressor can be used as a heat source for regenerating the absorbing liquid, so that the heats required to regenerate the absorbing liquid can be reduced and the energy saving of the heat pump system using waste heat can be performed. Furthermore, the temperature of the refrigerant to be supplied to the compressor can be reduced, so that it is unnecessary to separately provide a cooler for reducing the suction temperature of the compressor.

According to the present invention, the same liquid is used for both the lubrication oil of the compressor of the compression heat pump circuit and the absorbing liquid of the absorption heats pump circuit, whereby heat-exchange can be prevented from being disturbed by the mixture of the lubrication oil of the compressor and the absorbing liquid, and further the energy saving of the heat pump system using waste heat can be performed.

According to the present invention, the separator for separating the lubrication oil of the compressor and the refrigerant from the absorbing liquid of the absorption heat pump circuit is provided at the exit of the regenerator, and the lubrication oil of the compressor and the refrigerant which are separated by the separator is circulated in the compression heat pump circuit. Therefore, even when the lubrication oil of the compressor flows out into the circuit, the lubrication oil from the absorbing liquid can be supplied to the compression heat pump circuit, so that the lubrication performance of the compressor can be maintained and further the energy saving of the heat pump system using waste heat can be performed.

According to the present invention, there is provided the waste heat temperature control means for controlling the circulation pump of the absorbing liquid so that the temperature of the waste heat detected by the temperature sensor for detecting the temperature of the waste heat is kept to a predetermined temperature. Therefore, reduction of the efficiency of the absorption heat pump circuit can be suppressed, and further the energy saving of the heat pump system using waste heat can be performed.

BRIEF DESCRIPTION OF THE DRAWINGS

FIG. 13 is a schematic diagram showing a separator according to a modification of the present invention, wherein (A) is a diagram showing the whole of a regenerator and a separator, and (B) is an enlarged view of a portion B of the separator of (A).

MODES FOR CARRYING OUT THE PRESENT INVENTION

Embodiments according to the present invention will be described hereunder with reference to the drawings.

First Embodiment

Figure 1:
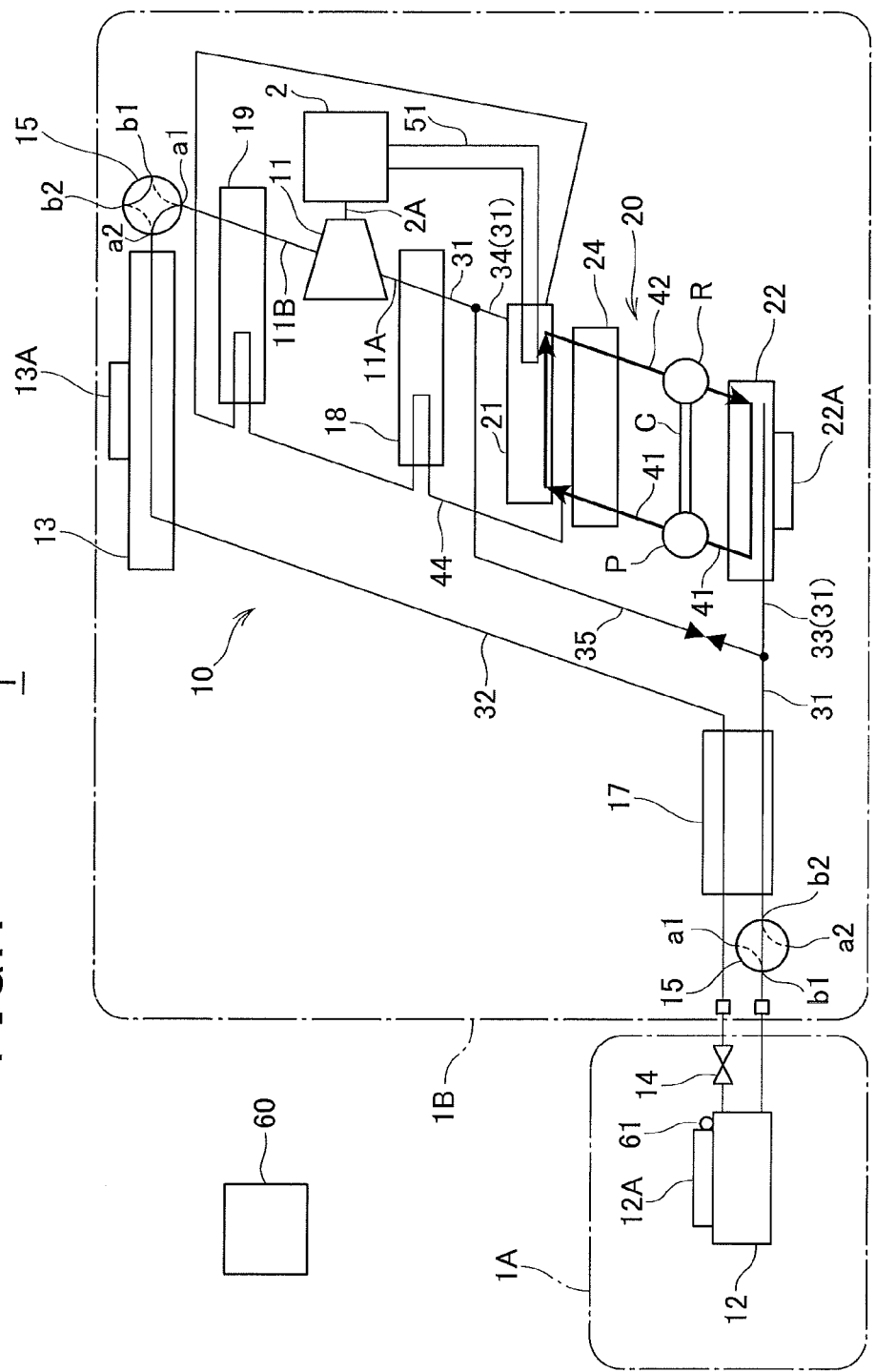
FIG. 1 is a circuit diagram showing a heat pump system using waste heat according to a first embodiment of the present invention.
Figure 2:
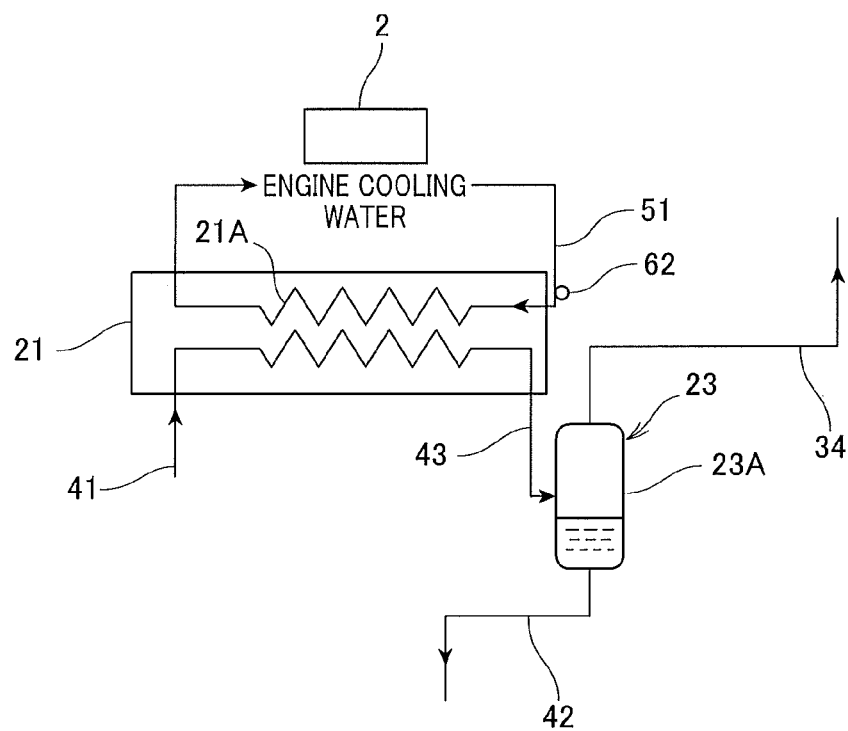
FIG. 2 is a schematic diagram showing a regenerator and a gas-liquid separator.

FIG. 1 is a circuit diagram showing a heat pump system using waste heat according to a first embodiment. FIG. 2 is a schematic diagram showing a regenerator and a gas-liquid separator.

The heat pump system using waste heat (a heat engine-driven vapor compression heat pump system) 1 is a so-called hybrid system having a compression heat pump circuit 10 using the shaft output of an engine (power engine, heat engine) 2 as a power source for a compressor 11 for compressing refrigerant, and an absorption heat pump circuit 20 using waste heat of the engine 2 as a heat source for a regenerator 21 for heating absorbing liquid.

The compression heat pump circuit 10 has a compressor 11, a use-side heat exchanger 12, a radiator 13, an expansion valve 14 and a four-way valve 15. The compressor 11 and the use-side heat exchanger 12 are connected to each other through a suction-side refrigerant pipe 31 at a suction port 11A side of the compressor 11, and a discharge-side refrigerant pipe 32 at a discharge port 11B side of the compressor 11. The four-way valve 15 is provided to the suction-side refrigerant pipe 31, and the four-way valve 15, the radiator 13 and the expansion valve 14 are provided to the discharge-side refrigerant pipe 32.

The compressor 11 compresses refrigerant flowing through the suction-side refrigerant pipe 31. The compressor 11 is connected to the shaft 2A of the engine 2, and the shaft output of the engine 2 is transmitted to the compressor 11. That is, the compressor 11 is configured to compress refrigerant by using the shaft output of the engine 2 as a power source. The engine 2 of this embodiment is constructed by a gas engine using city gas as fuel, but it is not limited to the gas engine.

The use-side heat exchanger 12 is a heat exchanger that supplies cold heat or hot heat to a thermal load (not shown) by evaporating or condensing refrigerant, and has a heat radiation device 12A (for example, fan) for radiating cold heat or hot heat of the refrigerant. The heat radiating device 12A is provided with a temperature sensor 61 for detecting the temperature of heat to be supplied to the thermal load.

The radiator 13 radiates heat of the refrigerant, and has a heat radiation device 13A (for example, fan) for radiating heat of the radiator 13.

The four-way valve 15 is switched so that the suction side and the discharge side of the compressor 11 intercommunicate with the radiator 13 and the use-side heat exchanger 12 respectively, thereby performing a switching operation between a cold heat operation for supplying cold heat to the thermal load and a hot heat operation for supplying hot heat to the thermal load. More specifically, under cold heat operation, refrigerant flows from the discharge side of the compressor 11 to the radiator 13 while the refrigerant flows from the use-side heat exchanger 12 to the suction side of the compressor 11, and under hot heat operation, the refrigerant flows from the discharge side of the compressor 11 to the use-side heat exchanger 12 while the refrigerant flows from the radiator 13 to the suction side of the compressor 11. In FIG. 1, the discharge side of the compressor 11 is represented by a point a1, the radiator 13 side is represented by a point a2, the use-side heat exchanger 12 side is represented by a point b1, and the suction side of the compressor 11 is represented by a point b2.

The compression heat pump circuit 10 is provided with a refrigerant heat exchanger 17 for performing heat-exchange between refrigerant of relatively high temperature and refrigerant vapor of relatively low temperature which flow in the compression heat pump circuit 10. In the refrigerant heat exchanger 17, under cold heat operation, the refrigerant supplied from the radiator 13 to the expansion valve 14 is cooled, and the refrigerant vapor supplied from the use-side heat exchanger 12 to the compressor 11 is heated. On the other hand, under hot heat operation, the refrigerant supplied from the expansion valve 14 to the radiator 13 is cooled, and the refrigerant vapor supplied from the radiator 13 to the compressor 11 is heated. COP (Coefficient Of Performance) in the compression heat pump circuit 10 can be enhanced by the refrigerant heat exchanger 17.

The absorption heat pump circuit 20 is provided to a suction-side refrigerant pipe 31 between the refrigerant heat exchanger 17 and the compressor 11, and connected to the compression heat pump circuit 10 in series. The absorption heat pump circuit 20 has a regenerator 21, an absorber 22 and a gas-liquid separator 23 (see FIG. 2). The refrigerant heat exchanger 17 and the absorber 22 are connected to each other through a refrigerant pipe 33, and the regenerator 21 and the compressor 11 are connected to each other through a refrigerant pipe 34. The regenerator 21 and the absorber 22 are connected to each other through a dense absorbing liquid pipe (feeding pipe) 41 and a rare absorbing liquid pipe (returning pipe) 42.

The absorber 22 makes the absorbing liquid absorb the refrigerant vapor supplied from the refrigerant pipe 33. The absorber 22 has a cooling device 22A (for example, a cooling water circulating device or a fan) for cooling heat occurring when the absorbing liquid absorbs the refrigerant vapor. The dense absorbing liquid pipe 41 extending to the regenerator 21 is connected to the absorber 22. The dense absorbing liquid pipe 41 is provided with a circulation pump P for circulating the absorbing liquid, and the absorbing liquid which has absorbed the refrigerant (dense absorbing liquid) is supplied from the absorber 22 to the regenerator 21 by driving the circulation pump P.

The regenerator 21 heats and regenerates the dense absorbing liquid supplied from the dense absorbing liquid pipe 41 by using waste heat of the engine 2 as a heat source. More specifically, as shown in FIG. 2, an engine cooling water pipe 51 through which engine cooling water which has withdrawn the waste heat of the engine 2 flows is connected to a cooling-water heat transfer pipe 21A of the regenerator 21. Although omitted from the illustrations, the engine cooling water of the engine cooling water pipe 51, for example, flows through a water jacket of the engine 2 and withdraws the waste heat of the engine 2 to be increased in temperature, further flows through an exhaust gas heat exchanger provided in an exhaust gas flow passage of the engine 2 and withdraws the waste heat of the exhaust gas to be increased temperature, and then supplied to the cooling-water heat transfer pipe 21A of the regenerator 21. As described above, the engine cooling water which has withdrawn the waste heat of the engine 2 is supplied to the cooling-water heat transfer pipe 21A of the regenerator 21, whereby the regenerator 21 heats and regenerates the absorbing liquid by using the high-temperature engine cooling water as a thermal source for the regenerator 21.

The gas-liquid separator 23 for separating the refrigerant vapor occurring through the heating and regeneration from the residual absorbing liquid (rare absorbing liquid) is connected to the exit of the regenerator 21. The gas-liquid separator 23 has a main body 23A in which the rare absorbing liquid is stocked, and a mixed liquid pipe 43 extending from the regenerator 21 is connected to an intermediate portion in an up-and-down direction of the main body 23A. The rare absorbing liquid pipe 42 extending to the absorber 22 is connected to a lower portion of the main body 23A, and a refrigerant pipe 34 is connected to an upper portion of the main body 23A. The refrigerant vapor is separated from the absorbing liquid by the gas-liquid separator 23, only the refrigerant vapor is supplied to the compressor 11, and the rare absorbing liquid from which the refrigerant vapor is separated is supplied to the absorber 22.

As shown in FIG. 1, the absorption heat pump circuit 20 is provided with the absorbing liquid heat exchanger 24 which heats the dense absorbing liquid supplied from the absorber 22 to the regenerator 21 with the rare absorbing liquid of relatively high temperature which is returned from the regenerator 21 to the absorber 22. The temperature of the dense absorbing liquid supplied to the regenerator 21 can be increased and the temperature of the rare absorbing liquid supplied to the absorber 22 can be reduced by the absorbing liquid heat exchanger 24.

In FIG. 1, the user-side heat exchanger 12 containing the heat radiation device 12A and the expansion valve 14 constitutes an indoor unit 1A of the heat pump system 1 using waste heat, and the other constituent elements constitute an outdoor unit 1B of the heat pump system 1 using waste heat.

The heat pump system 1 using waste heat is switched between the cold heat operation and the hot heat operation by switching the four-way valve under the control of a control device 60. The control device 60 controls the heat pump system 1 using waste heat so that heat supplied to the thermal load (not shown) is equal to a predetermined set temperature.

Under cold operation, the four-way valve 15 is switched so that the suction side of the compressor 11 intercommunicates with the use-side heat exchanger 12 and the discharge side of the compressor 11 intercommunicates with the radiator 13.

The refrigerant vapor vaporized in the use-side heat exchanger 12 is supplied to the absorber 22 through the refrigerant heat exchanger 17, and absorbed by the absorbing liquid in the absorber 22. The dense absorbing liquid which has absorbed the refrigerant is supplied to the regenerator 21 through the absorbing liquid heat exchanger 24 by the circulation pump P. As shown in FIG. 2, the dense absorbing liquid absorbs heat from the engine cooling water flowing in the cooling-water heat transfer pipe 21A of the regenerator 21 to be heated till a regeneration temperature. The heated dense absorbing liquid is supplied to the gas-liquid separator 23, and the refrigerant vapor is separated in the gas-liquid separator 23. The rare absorbing liquid from which the refrigerant vapor is separated is supplied to the absorbing liquid heat exchanger 24 as shown in FIG. 1 to heat the dense absorbing liquid flowing through the dense absorbing liquid pipe 41 in the absorbing liquid heat exchanger 24, and is returned to the absorber 22.

The refrigerant vapor separated in the gas-liquid separator 23 (FIG. 2) is compressed in the compressor 11 to fall into a high-temperature and high-pressure state, and the refrigerant under the high-temperature and high-pressure state is cooled in the radiator 13. The cooled refrigerant is cooled by the refrigerant vapor at the downstream side of the use-side heat exchanger 12 in the refrigerant heat exchanger 17, and expanded in the expansion valve 14 to fall into a low-temperature and low-pressure state. The refrigerant under the low-temperature and low-pressure state derives heat of the thermal load and vaporizes in the use-side heat exchanger 12. The refrigerant vapor which is vaporized in the use-side heat exchanger 12 repeats the cycle that it is supplied to the absorber 22 through the refrigerant heat exchanger 17 again.

On the other hand, under the hot heat operation, the four-way valve 15 is switched so that the suction side of the compressor 11 intercommunicates with the radiator 13 and the discharge side of the compressor 11 intercommunicates with the use-side heat exchanger 12.

The refrigerant vapor vaporized in the radiator 13 is supplied to the absorber 22 through the refrigerant heat exchanger 17. The regeneration of the refrigerant in the absorption heat pump circuit 20 is performed in the same way as the cold heat operation, and thus the description thereof is omitted.

The refrigerant vapor regenerated in the absorption heat pump circuit 20 is compressed in the compressor 11 to fall into a high-temperature and high-pressure state, and the refrigerant under the high-temperature and high-pressure state radiate heat to the thermal load in the use-side heat exchanger 12 and cooled. The cooled refrigerant expands in the expansion valve 14 to fall into a low-temperature and low-pressure state, is cooled by the refrigerant vapor at the downstream side of the radiator 13 in the refrigerant heat exchanger 17, and vaporizes in the radiator 13. The refrigerant vapor vaporized in the radiator 13 repeats the cycle that it is supplied to the absorber 22 through the refrigerant heat exchanger 17 again.

As described above, in the heat pump system 1 using waste heat, the compression heat pump circuit 10 and the absorption heat pump circuit 20 are disposed in series so that the refrigerant regenerated by the regenerator 21 of the absorption heat pump circuit 20 is supplied to the suction port 11A of the compressor 11 of the compression heat pump circuit 10.

On the other hand, when the compression heat pump circuit and the absorption heat pump circuit are disposed in parallel so that the refrigerant regenerated by the regenerator of the absorption heat pump circuit is supplied to the discharge port of the compressor of the compression heat pump circuit, it is necessary to match the high pressure of the compression heat pump circuit with the high pressure of the absorption heat pump circuit.

In this embodiment, since the compression heat pump circuit 10 and the absorption heat pump circuit 20 are disposed in series, it is unnecessary to provide a mechanism for matching the high pressure of the compression heat pump circuit 10 with the high pressure of the absorption heat pump circuit 20, and thus the construction can be simplified.

In the absorption heat pump circuit 20 using the waste heat of the engine 2, the temperature of the engine cooling water has not reached the regeneration temperature (for example, above 65° C.) required to the regenerator 21 at the time when the heat pump system 1 using waste heat is started. In the heat pump system 1 using waste heat in which the compression heat pump circuit 10 and the absorption heat pump circuit 20 are disposed in series, even when the absorbing liquid is circulated in the absorption heat pump circuit 20 under the above state, refrigerant cannot be regenerated, and thus refrigerant vapor which cannot be absorbed is filled in the absorber 22.

Therefore, in this embodiment, the suction-side refrigerant pipe 31 is provided with a bypass pipe 35 which bypasses the absorption heat pump circuit 20, whereby refrigerant which cannot be absorbed is passed through the bypass pipe 35 and directly returned to the compressor 11 when the temperature of the engine cooling water is low like a start-up time of the engine 2.

More specifically, the bypass pipe 35 is provided with a bypass valve 16 for opening/closing the bypass pipe 35. The bypass valve 16 is a control valve for controlling the flow rate of refrigerant, the flow rate of refrigerant flowing in the bypass pipe 35 and the flow rate of refrigerant flowing through the refrigerant pipe 33 to the absorber 22 are controlled by the bypass valve 16. In the following description, the refrigerant flow rate in the refrigerant pipe 33 is represented by Fa, the refrigerant flow rate of the bypass pipe 35 is represented by Fb and the ratio of the refrigerant flow rates is represented by Fa/(Fa+Fb). A temperature sensor 62 for detecting the temperature of the engine cooling water (the temperature of the waste heat supplied to the regenerator 21) is provided at the entrance side of the regenerator 21 of the engine cooling water pipe 51, and the control device 60 controls the bypass valve 16 on the basis of the temperature detected by the temperature sensor 62.

Figure 3:
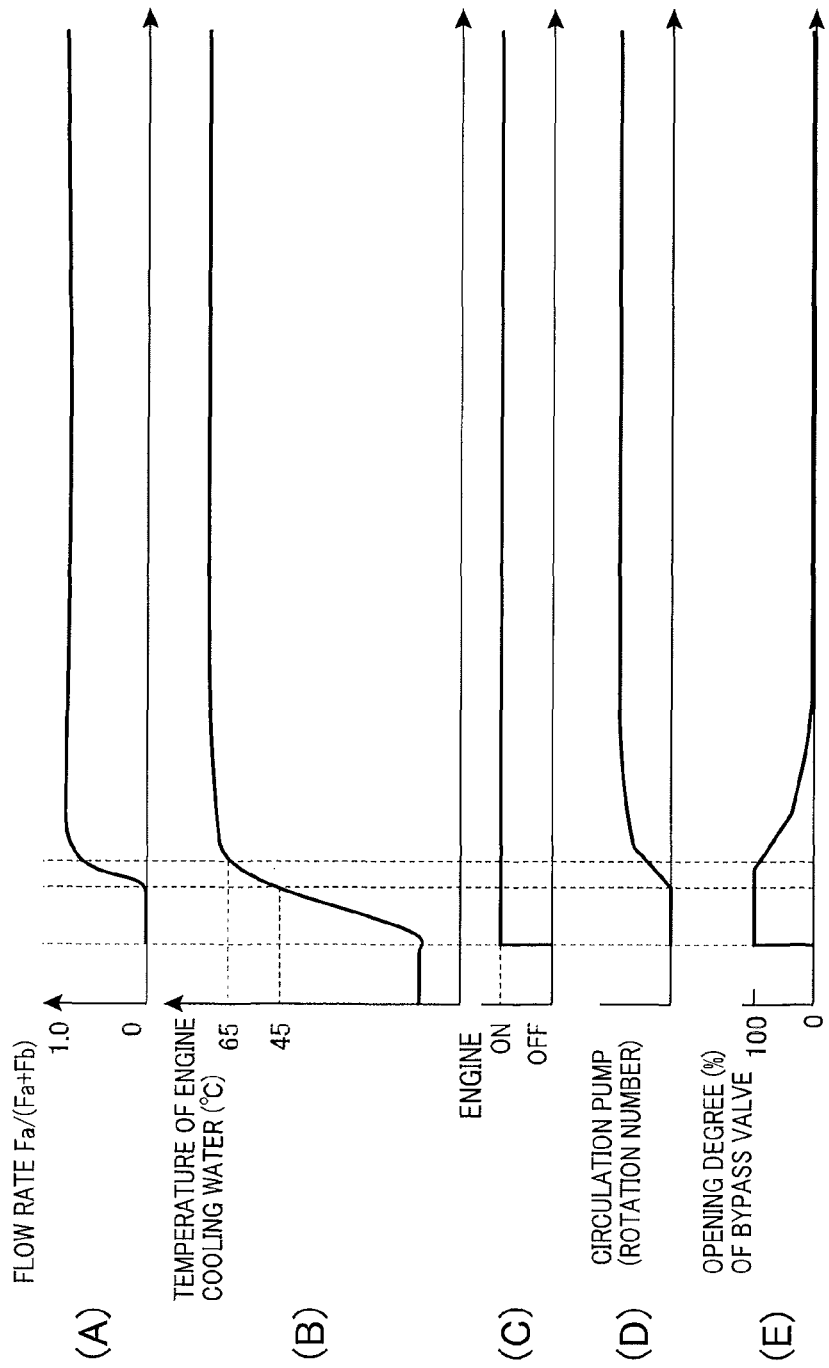
FIG. 3 is a graph showing the operation state of the heat pup system using waste heat, wherein (A) shows a flow ratio, (B) shows an engine cooling water temperature (° C.), (C) shows the operation state (ON/OFF) of the engine, (D) shows the rotation number of a circulation pump, and (E) shows the opening degree (%) of a bypass valve.

FIG. 3 is a graph showing the operation state of the heat pump system 1 using waste heat, wherein FIG. 3(A) is a diagram showing the flow rate, FIG. 3(B) is a diagram showing the temperature (° C.) of the engine cooling water, FIG. 3(C) is a diagram showing the operation state (ON/OFF) of the engine 2, FIG. 3(D) is a diagram showing the rotation number of the circulation pump P, and FIG. 3(E) is a diagram showing the opening degree (%) of the bypass valve 16. In FIG. 3, the abscissa axis represents the operation time of the heat pump system 1 using waste heat.

As shown in FIGS. 1 and 3, the control device 60 starts up the engine 2 by fully opening the bypass valve 16 when the heat pump system 1 using waste heat is started up, and the circulation pump P is actuated after the engine cooling water reaches a predetermined temperature (for example, 45° C.) Thereafter, the control device 60 controls the bypass valve 16 so that the bypass valve 16 is gradually closed, and completely closed the bypass valve 16 under a rated operation state. Accordingly, refrigerant can be prevented from being excessively fed to the absorption heat pump circuit 20 side at the start-up time of the engine 2 or the like. Therefore, a proper amount of refrigerant can be fed to the absorber 22.

When the state falls into the rated operation state, in order to effectively use limited waste heat of the engine 2, the controller 60 controls the absorption heat pump 20 so that the temperature of the engine cooling water is kept to a predetermined temperature (for example, the temperature at the entrance of the regenerator 21 is around 85° C.)

In the heat pump system 1 using waste heat, when the amount of consumed fuel in the engine 2 increases/decreases, the amount of waste heat also increases/decreases proportionally. Therefore, as compared with a case where only the compression heat pump circuit is used, capacity variation is larger by the amount corresponding to the effectively used waste heat of the engine cooling water. Accordingly, the controller 60 controls the variation of fuel input so that the variation of fuel input in connection with the load variation of the thermal load is reduced by only the amount (about 25%) corresponding to the contribution of the used waste heat to the absorption heat pump circuit 20 as compared with the case where only the compression heat pump circuit is used.

When the rate falls into the rated operation state, in order to effectively use the limited waste heat of the engine 2, the control device 60 controls the circulation pump P so as to keep the temperature of the engine cooling water to a predetermined temperature (for example, the temperature at the entrance of the regenerator 21 is around 85° C.), thereby controlling the circulation amount of the absorbing liquid. Accordingly, the regeneration temperature is kept substantially constant irrespective of the temperature of cold heat or hot heat to be supplied to the thermal load, so that the reduction of the efficiency of the absorption heat pump circuit 20 can be suppressed. The control device 60 functions as waste heat temperature control means for controlling the temperature of the waste heat of the engine 2 (the temperature of the engine cooling water).

In the heat pump system 1 using waste heat, the amount of waste heat increases/decreases in proportion to the increase/decrease of the consumption amount of fuel in the engine 2. Therefore, the capacity variation is larger by the effective use of the waste heat of the engine cooling water as compared with the case where only the compression heat pump circuit is used. Accordingly, the control device 60 controls the input variation of the power source of the engine 20 (fuel in this embodiment) to the load variation of the thermal load so that the input variation of the power source of the engine 20 is reduced to be smaller by only the contribution rate (about 25% in this embodiment) of use of waste heat for the absorption heat pump circuit 20 to the entire capacity of the heat pump system 1 using waste heat as compared with the case where only the compression heat pump circuit is used. Accordingly, when the input of the power source to the engine 2 is varied, rapid variation of cold heat or hot heat to be supplied to the thermal load can be prevented. The control device 60 functions as heat capacity control means for controlling the heat capacity of cold heat or hot heat to be supplied from the use-side heat exchanger 12 of the compression heat pump circuit 10 to the thermal load.

As described above, the heat pump system 1 using waste heat can operate the absorption heat pump circuit 20 by only the use of waste heat of the engine 2, and thus it can be regarded as a self-completion type system using waste heat. Accordingly, in the heat pump system 1 using waste heat, the connection to the external (thermal load) may be configured as in the case of a normal gas heat pump (GHP).

As described above, in the heat pump system 1 using waste heat shown in FIG. 1, refrigerant in the compression heat pump circuit 10 is circulated into the absorption heat pump circuit 20, and this refrigerant is circulated into the compression heat pump circuit 10. Accordingly, not pure refrigerant, but mixture of refrigerant and absorbing liquid is circulated in the compression heat pump circuit 10. Therefore, there is a risk that the absorbing liquid is mixed with lubrication oil of the compressor 11, and thus when liquid having no lubricating property is used as the absorbing liquid, it disturbs the lubrication of the compressor 11.

Furthermore, in the compression heat pump circuit 10, the lubrication oil of the compressor 11 flows out in the form of droplets from the compressor 11 into the circuit concerned, and circulates in the circuit integrally with the refrigerant. The lubrication oil flowing out from the compressor 11 moves together with the refrigerant, reaches the absorber 22 and then circulates in the absorption heat pump circuit 20 integrally with the absorbing liquid. When this is left undisturbed, there is a risk that the lubrication oil held in the compressor 11 is eventually reduced, and the lubrication performance of the compressor cannot be kept. Furthermore, the lubrication oil is mixed with the refrigerant and the absorbing liquid, and thus there is a risk that the heat exchange of the refrigerant and the absorbing liquid is disturbed by the lubrication oil.

Therefore, in the heat pump system 1 using waste heat according to this embodiment, the same liquid is used for the lubrication oil of the compressor 11 and the absorbing liquid of the absorption heat pump circuit 20. That is, ion liquid material which also serves as the lubrication oil of the compressor 11 is used as the absorbing liquid. When $CO_2$ (carbon dioxide) is used for the refrigerant, for example, 1-alkyl-3-methylimidazolium hexafluorophosphate ([Cnmin][PF6]), or 1-alkyl-3-methylimidazolium tetrafluoroborate ([Cnmin][BF4]) is used as the same liquid. Furthermore, when HFC or HFO is used as the refrigerant, for example, [bmin][PF6]: 1-Butyl-3-methylimidazolium hexafluorophosphate is used as the same liquid. As described above, the lubrication oil of the compressor 11 and the absorbing liquid are made to be identical to each other, thereby preventing disturbance of the lubrication of the compressor 11 and also reduction of the heat exchange efficiency of the absorbing liquid even when the lubrication oil of the compressor 11 and the absorbing liquid are mixed with each other. Furthermore, it is unnecessary to provide a separator for separating the lubrication oil of the compressor 11, so that the number of parts can be reduced and the manufacturing process can be simplified.

The radiator 13 functions as a gas cooler under cold heat operation when non-condensable refrigerant such as $CO_2$ or the like which falls into a supercritical state at the high pressure side is used as the refrigerant, or functions as a condenser under cold heat operation when condensable refrigerant such as HFC, HFO or the like is used as the refrigerant. Likewise, the use-side heat exchanger 12 functions as a gas cooler under hot heat operation when the non-condensable refrigerant is used as the refrigerant or functions as a condenser under hot heat operation when the condensable refrigerant is used as the refrigerant.

Furthermore, this embodiment is provided with an absorbing liquid supply device (absorbing liquid supply mean) 70 (see FIG. 4) for supplying absorbing liquid (ion liquid) as lubrication oil to the compressor 11.

Figure 4:
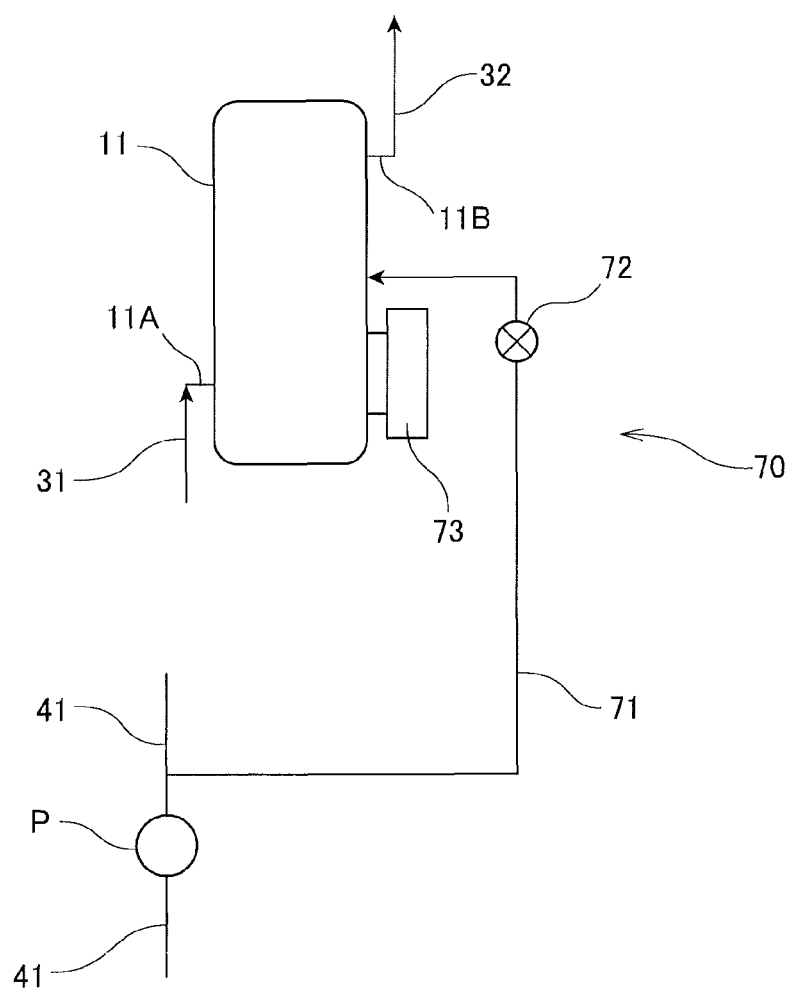
FIG. 4 is a schematic diagram showing an absorbing liquid supply device.

FIG. 4 is a schematic diagram showing the absorbing liquid supply device 70.

The absorbing liquid supply device 70 has an absorbing liquid branch pipe 71 which is branched from the dense absorbing liquid pipe 41 at the downstream side of the circulation pump P, an opening/closing valve 72 which is provided to the absorbing liquid branch pipe 71 and opens/closes the absorbing liquid branch pipe 71, and a lubrication oil amount sensor (oil level sensor) 73 which is provided to the compressor 11 and detects the amount of the lubrication oil (ion liquid) of the compressor 11.

When the lubrication oil amount sensor 73 detects that the lubrication oil held in the compressor 11 underruns a predetermined amount required for the compressor 11, the control device 60 opens the opening/closing valve 72 of the absorbing branch pipe 71, and supplies the absorbing liquid as the lubrication oil to the compressor 11. On the other hand, when the lubrication oil amount sensor 73 detects that the lubrication oil held in the compressor 11 is equal to or more than the predetermined amount, the control device 60 closes the opening/closing valve 72 of the absorbing liquid branch pipe 71. As described above, the absorbing liquid of the absorption heat pump circuit 20 can be supplied to the compressor 11 as the lubrication oil for the compressor 11 by providing the absorbing liquid supply device 70, so that the reduction of the lubrication oil held in the compressor 11 can be prevented. The absorbing liquid supply device 70 may be omitted.

In the hybrid type heat pump system 1 using waste heat, when an input (regeneration performance of refrigerant) in the regenerator 21 to the load of the thermal load is insufficient, the circulation amount of the absorbing liquid is increased, so that the input of the regenerator 21 increases. For example, in a conventional heat pump system using waste heat, the circulation pump is controlled in accordance with the temperature of hot heat to be supplied to the thermal load. Therefore, when the input of the regenerator to the load of the thermal load is insufficient, the circulation amount of the absorbing liquid is increased. However, when the circulation amount of the absorbing liquid increases, the regeneration temperature decreases, and the efficiency in the absorption heat pump circuit 20 decreases. Furthermore, in the conventional hybrid type heat pump system using waste heat, the amount of consumption of electricity is suppressed by driving the compressor with an engine, but the shaft-end efficiency of the engine is low (about 30%) and most of heat (70%) is not used. Therefore, energy saving is required for the heat pump system using waste heat.

Therefore, the heat pump system 1 using waste heat is provided with a suction-side refrigerant heat withdrawer 18 and a discharge-side refrigerant heat withdrawer 19 which heat the absorbing liquid with the waste heat of the refrigerant of the compression heat pump circuit 10.

Figure 5:
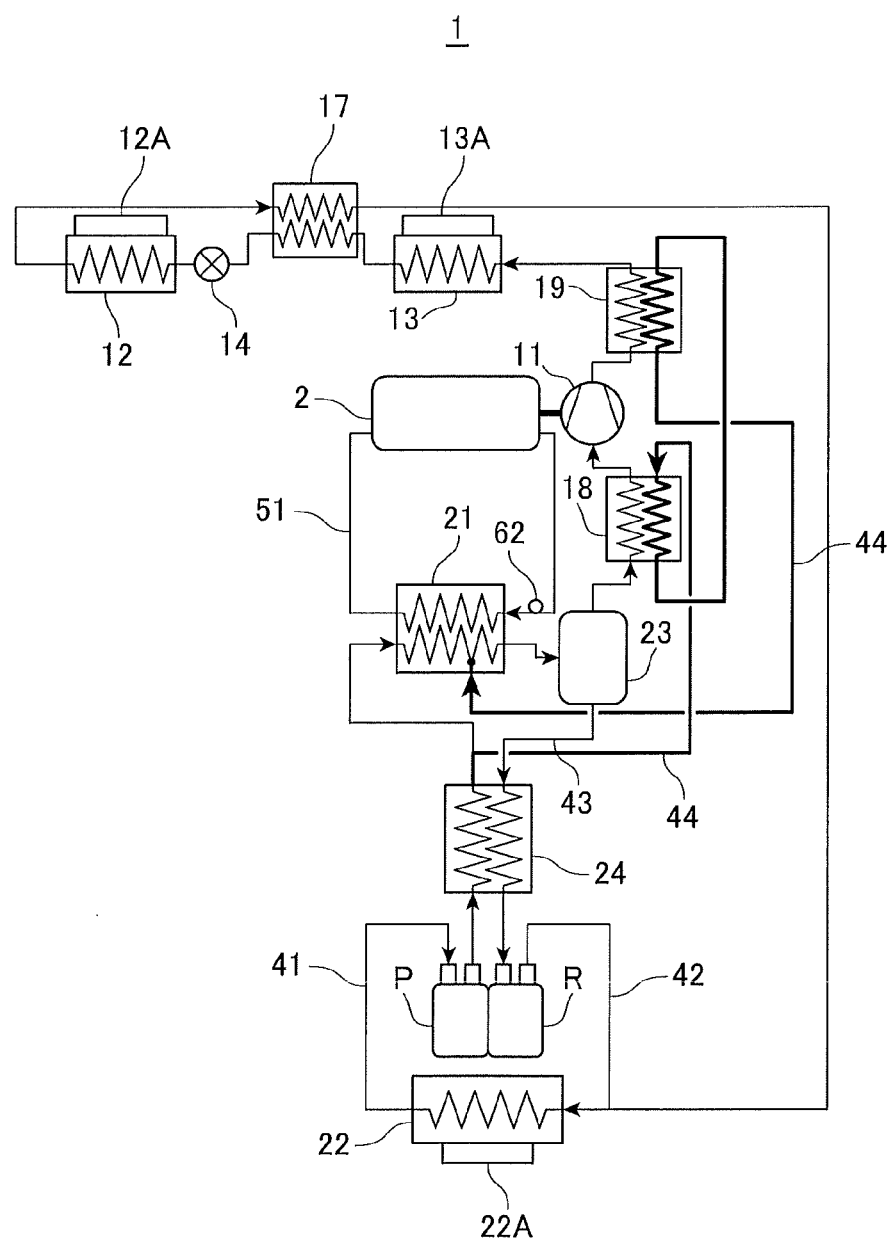
FIG. 5 is a circuit diagram showing a heat pump system using waste heat.

FIG. 5 is a circuit diagram showing the heat pump system 1 using waste heat. In FIG. 5, the four-way valve 15 and a driving device M (see FIG. 6) are omitted.

As shown in FIGS. 1 and 5, the suction-side refrigerant heat withdrawer 18 is a heat exchanger for heat-exchanging the refrigerant to be supplied to the compressor 11 and the absorbing liquid to be supplied to the regenerator 21. More specifically, the suction-side refrigerant pipe 31 of the compression heat pump circuit 10 is connected to the compressor 11 through the suction-side refrigerant heat withdrawer 18. The dense absorbing pipe 41 of the absorption heat pump circuit 20 has a dense absorbing liquid bypass pipe 44 which is branched at the downstream side of the absorption liquid heat exchanger 24, and the dense absorbing liquid bypass pipe 44 is connected to the regenerator 21 through the suction-side refrigerant heat withdrawer 18.

Accordingly, a part of the dense absorbing liquid flowing through the dense absorbing liquid pipe 41 is branched at the downstream side of the absorbing liquid heat exchanger 24, and supplied to the suction-side refrigerant heat withdrawer 18 through the dense absorbing liquid bypass pipe 4. The dense absorbing liquid supplied to the suction-side refrigerant heat withdrawer 18 is heated and increased in temperature by the refrigerant vapor flowing through the suction-side refrigerant pipe 31 in the suction-side refrigerant heat withdrawer 18. That is, the refrigerant vapor of relatively high temperature to be supplied to the compressor 11 is cooled by the dense absorbing liquid flowing through the dense absorbing bypass pipe 44 in the suction-side refrigerant heat withdrawer 18. As described above, the heat of the refrigerant vapor to be supplied to the compressor 11 can be used as a heat source for regenerating the absorbing liquid, and thus the heat required for regeneration of the absorbing liquid can be reduced. Furthermore, the temperature of refrigerant supplied to the compressor 11 can be reduced, so that it is unnecessary to specially provide a cooler for reducing the suction temperature of the compressor 11.

The dense absorbing liquid bypass pipe 44 is further provided with a discharge-side refrigerant heat withdrawer 19. The discharge-side refrigerant heat withdrawer 19 is a heat exchanger for heat-exchanging the refrigerant discharged from the compressor 11 and the absorbing liquid supplied to the regenerator 21. More specifically, the discharge-side refrigerant pipe 32 of the compression heat pump circuit 10 is connected to the four-way valve 15 through the discharge-side refrigerant heat withdrawer 19. The dense absorbing liquid bypass pipe 44 of the absorption heat pump circuit 20 is passed through the suction-side refrigerant heat withdrawer 18 and further through the discharge-side refrigerant heat withdrawer 19, and then connected to the regenerator 21.

Accordingly, the dense absorbing liquid heated in the suction-side refrigerant heat withdrawer 18 is supplied to the discharge-side refrigerant heat withdrawer 19, further heated by the refrigerant flowing in the discharge-side refrigerant pipe 32 in the discharge-side refrigerant heat withdrawer 19, and supplied to the regenerator 21. As described above, the heat of the refrigerant which is compressed and increased in temperature in the compressor 11 can be used as a heat source for regenerating the absorbing liquid, so that the heat required to regenerate the absorbing liquid can be further reduced.

The suction-side refrigerant heat withdrawer 18 and the discharge-side refrigerant heat withdrawer 19 are relatively lower in temperature than the regenerator 21. Therefore, by providing the dense absorbing liquid bypass pipe 44 with the suction-side refrigerant heat withdrawer 18 and the discharge-side refrigerant heat withdrawer 19, the heat exchange efficiency of the absorbing liquid can be more greatly enhanced as compared with a case where the whole absorbing liquid fed from the absorber 22 to the regenerator 21 is heated.

In the heat pump system 1 using waste heat, the amount of consumption of electricity is suppressed by driving the compressor 11 with the engine 2. However, the circulation pump P needs a driving source different from the engine 2 for driving the compressor 11, and thus energy saving of the circulation pump P is needed.

Therefore, in this embodiment, a reverse pump (power withdrawer) R is provided to the rare absorbing pipe 42 from the regenerator 21 to the absorber 22.

Figure 6:
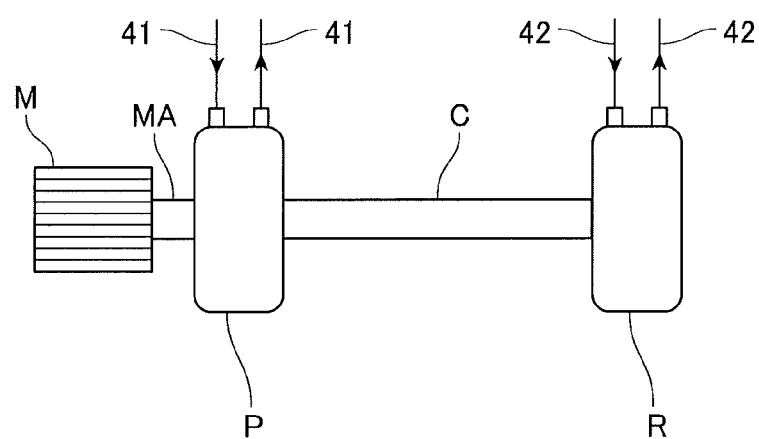
FIG. 6 is a schematic diagram showing a circulating pump and a reverse pump.

FIG. 6 is a schematic diagram showing the circulation pump P and the reverse pump R.

The shaft of the circulation pump P is connected to the shaft MA of a driving device (driving source) M. The circulation pump P is rotated by the rotational driving force of the driving device M so that the dense absorbing liquid flowing in the dense absorbing pipe 41 is fed. A power engine such as a motor or the like is used as the driving device M, for example.

The reverse pump R is a pump which is rotationally driven by the rare absorbing liquid flowing in the rare absorbing liquid pipe 42. The shaft of the reverse pump R (not shown) is connected to the shaft (not shown) of the circulation pump P. Therefore, the rotational energy of the reverse pump R is withdrawn by the circulation pump P, whereby the driving power of the driving device M can be suppressed. Accordingly, the energy saving of the circulation pump P can be performed.

Here, a difference corresponding to the mass flow rate of refrigerant returned from the absorption heat pump circuit 20 to the compression heat pump circuit 10 (FIG. 1) occurs between the mass flow rate of absorbing liquid flowing into the circulation pump P and the mass flow rate of absorbing liquid to flow into the reverse pump R. Therefore, when the circulation pump P and the reverse pump R are designed to have the same displacement volume, the absorbing liquid corresponding to the above difference flows into the reverse pump R. As a result, the balance in mass flow rate between the absorbing liquid passing through the circulation pump P and the absorbing liquid passing through the reverse pump R is broken, so that the amount of the absorbing liquid at the gas-liquid separator 23 and the regenerator 21 is excessively small. Therefore, there is a risk that gaseous refrigerant vapor which should not originally flow into the reverse pump R may flow into the reverse pump R.

Therefore, in this embodiment, the shaft of the circulation pump R and the shaft of the reverse pump P are connected to each other so that the mass flow rate of the absorbing liquid passing through the circulation pump P is equal to the mass flow rate of the absorbing liquid passing through the reverse pump R. More specifically, the circulation pump P and the reverse pump R are coaxially connected to each other through a common rotating shaft C, and the reverse pump R is designed so that the displacement volume Vr of the reverse pump R satisfies the following equation (1) with respect to the displacement volume Vp of the circulation pump P.

$$V_p \times n \times \rho_p \times x_p = V_r \times n \times \rho_r \times x_r + m_{comp} \quad (1)$$

Here, in the equation (1), V represents the displacement volume (m$^3$), ρ represents the density (kg/m$^3$), x represents the mass concentration of the refrigerant in the absorbing liquid (kg refrigerant/kg absorbing liquid), n represents the rotation number (revolution/second), m represents the refrigerant circulating amount (kg/second) of the compression heat pump circuit 10, the subscript p represents the circulation pump P, the subscript r represents the reverse pump R, and the subscript comp represents the compressor 11.

As described above, in this embodiment, the mass flow rate of the absorbing liquid passing through the circulation pump P is equal to the mass flow rate of the absorbing liquid passing through the reverse pump R, so that refrigerant vapor can be prevented from flowing into the reverse pump R. Furthermore, the circulation pump P and the reverse pump R can be coaxially connected to each other, so that the assembling work of the circulation pump P and the reverse pump R can be simplified.

As described above, according to this embodiment, the absorption heat pump circuit 20 has the reverse pump R in the rare absorbing liquid pipe 42 extending from the regenerator 21 to the absorber 22, and is configured so that the rotational energy based on the reverse pump R can be withdrawn by the circulation pump P for the absorbing liquid. The driving power of the driving device M as the driving source for the circulation pump P can be suppressed by the above construction, so that the energy saving of the circulation pump P can be performed.

Furthermore, according to this embodiment, the circulation pump P and the reverse pump R have the common rotating shaft C, and thus the assembling work of the circulation pump P and the reverse pump R can be simplified.

The above embodiment is configured so that the displacement volume $v_r$ of the reverse pump satisfies the equation (1) with respect to the displacement volume $v_p$ of the circulation pump. According to this configuration, the mass flow rate of the absorbing liquid passing through the circulation pump P and the mass flow rate of the absorbing liquid passing through the reverse pump R are equal to each other, so that refrigerant vapor can be prevented from flowing into the reverse pump R.

Furthermore, the above embodiment is configured to have the suction-side refrigerant heat withdrawer 18 for heat-exchanging the refrigerant supplied to the compressor 11 and the absorbing liquid supplied to the regenerator 21. According to this construction, the heat of the refrigerant vapor to be supplied to the compressor 11 can be used as the heat source for regenerating the absorbing liquid, and thus the heat required to regenerate the absorbing liquid can be reduced and the energy saving of the heat pump system 1 using waste heat can be performed. Furthermore, the temperature of the refrigerant to be supplied to the compressor 1 can be reduced, so that it is unnecessary to specially provide a cooler for reducing the suction temperature of the compressor 11.

Furthermore, according to this embodiment, the dense absorbing liquid bypass pipe 44 branched from the dense absorbing liquid pipe 41 extending from the absorber 22 to the regenerator 21 is provided, and the suction-side refrigerant heat withdrawer 18 is provided to the dense absorbing liquid bypass pipe 44. Since the suction-side refrigerant heat withdrawer 18 is relatively lower in temperature than the regenerator 21, the heat exchange efficiency of the absorbing liquid can be more greatly enhanced as compared with the case where the whole absorbing liquid fed from the absorber 22 to the regenerator 21 is heated.

Still furthermore, this embodiment is configured to have the discharge-side refrigerant heat withdrawer 19 for performing the heat-exchange between the refrigerant discharged from the compressor 11 and the absorbing liquid to be supplied to the regenerator 21 is provided. According to this configuration, the heat of the refrigerant vapor which is compressed and increased in temperature in the compressor 11 can be used as a heat source for regenerating the absorbing liquid, so that the heat required to regenerate the absorbing liquid can be further reduced. As a result, the energy saving of the heat pump system 1 using waste heat can be more effectively performed.

Furthermore, according to this embodiment, the same liquid is used for the lubrication oil of the compressor 11 of the compression heat pump circuit 10 and the absorbing liquid of the absorption heat pump circuit 20, and thus any trouble caused by the mixture between the lubrication oil of the compressor 11 and the absorbing liquid can be prevented.

Still furthermore, according to this embodiment, the absorbing liquid supply device 70 for supplying the absorbing liquid of the absorption heat pump circuit 20 to the compressor 11 as the lubrication oil of the compressor 11 is provided, so that the lubrication oil held in the compressor 11 can be prevented from decreasing.

Still furthermore, this embodiment is configured so that the refrigerant which is regenerated by the regenerator 21 of the absorption heat pump circuit 20 is supplied to the suction port 11A of the compressor 11 of the compression heat pump circuit 10. According to this configuration, the compression heat pump circuit 10 and the absorption heat pump circuit 20 can be disposed in series, so that it is unnecessary to match the high pressure of the compression heat pump circuit 10 with the high pressure of the absorption heat pump circuit 20.

Still furthermore, this embodiment is configured so that the refrigerant which is regenerated by the regenerator 21 of the absorption heat pump circuit 20 is supplied to the suction port 11A of the compressor 11 of the compression heat pump circuit 10, and also is configured to have the temperature sensor 62 for detecting the temperature of waste heat to be supplied to the regenerator 21 and the control device 60 as the waste heat temperature control means for controlling the circulation pump P of the absorbing liquid so that the temperature of the waste heat detected by the temperature sensor 62 is kept to a predetermined temperature (the entrance temperature of the regenerator 21 is around 85° C.). According to this configuration, the regeneration temperature can be kept substantially fixed irrespective of the temperature of cold heat or hot heat to be supplied to the thermal load, so that the decrease of the efficiency of the absorption heat pump circuit 20 can be suppressed.

Furthermore, according to this embodiment, there is provided the bypass pipe 35 for supplying the refrigerant vaporized in the compression heat pump circuit 10 to the suction port 11A of the compression 11 while the refrigerant bypasses the absorption heat pump circuit 20, the bypass valve 16 for controlling the refrigerant amount is provided to the bypass pipe 35, and the control device 60 controls the bypass valve 16 on the basis of the temperature of the waste heat detected by the temperature sensor 62. According to this construction, refrigerant which cannot be absorbed by the absorber 22 can be directly returned to the compressor 11 through the bypass pipe 35, so that a proper amount of refrigerant which is matched with the temperature of the waste heat can be fed to the absorber 22.

According to this embodiment, the control device 60 functions as the heat capacity control means for controlling the heat capacity of cold heat or hot heat to be supplied from the use-side heat exchanger 12 of the compression heat pump circuit 10 to the thermal load, and the input variation of the power source of the engine 2 is reduced by only the amount corresponding to the capacity contribution rate of the absorption heat pump circuit 20 to the whole capacity of the heat pump system 1 using waste heat. According to this construction, the cold heat or hot heat to be supplied to the thermal load can be prevented from rapidly varying when the input of the power source of the engine 2 is changed.

Second Embodiment

In the first embodiment, the same liquid is used for the lubrication oil of the compressor 11 and the absorbing liquid of the absorption heat pump circuit 20, but the same liquid is not necessary used.

In the second embodiment, non-condensable refrigerant such as $CO_2$ or the like which falls into the supercritical state at the high pressure side, or condensable refrigerant such as HFC, HFO, water, ammonium, chlorofluorocarbon-based material or the like is used as the refrigerant, and absorbent such as ion liquid material, water or the like which can absorb the refrigerant being used is used as the absorbing liquid.

Lubrication oil which is proper to lubrication for the compressor 11 is used as the lubrication oil. Furthermore, the absorbing liquid supply device 70 is not provided.

As described above, when absorbing liquid having no lubricating property is used as the absorbing liquid or when lubrication oil which is unsuitable for the absorbing liquid is used as the lubrication oil, a separator for separating the lubrication oil may be provided to the refrigerant pipe extending from the regenerator 21 to the compressor 11. In the second embodiment, a separator 123 may be provided in place of the gas-liquid separator 23.

Figure 7:
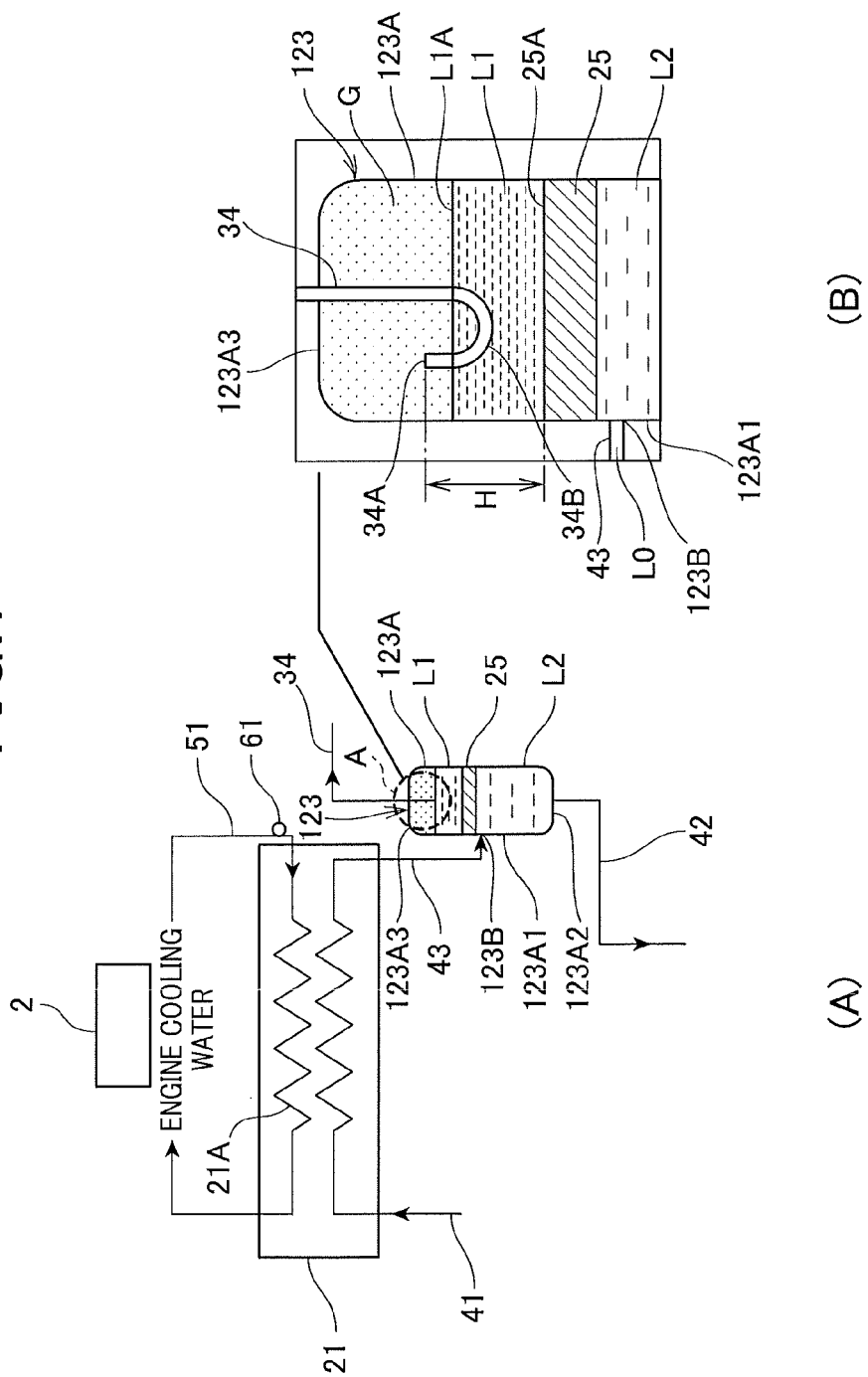
FIG. 7 is a schematic diagram showing a regenerator and a separator according to a second embodiment, wherein (A) is a diagram showing the whole of the regenerator and the separator, and (B) is an enlarged view of a portion A of the separator A of (A).

FIG. 7 is a schematic diagram showing the regenerator 21 and the separator 123 according to the second embodiment, wherein FIG. 7(A) is a diagram showing the whole of the regenerator and the separator, and FIG. 7(B) is an enlarged view of a portion A of the separator of FIG. 2(A).

As described above, the lubrication oil of the compressor 11 flows out into the compression heat pump circuit 10, and circulates in the compression heat pump circuit 10 and the absorption heat pump circuit 20 integrally with the refrigerant. If this is left undisturbed, there is a risk that the lubrication oil held in the compressor 11 is eventually reduced and thus the lubricating property of the compressor 11 cannot be kept.

Therefore, in this embodiment, as shown in FIG. 7, the separator 123 for separating lubrication oil L1 and refrigerant vapor G from mixture liquid L0 comprising lubrication oil, refrigerant vapor which occurs through heating and regeneration, and absorbing liquid, and regenerating absorbing (rare absorbing liquid) L2 is connected to the exit of the regenerator 21. The separator 123 has a main body 123A in which the mixture liquid L0 is stocked, and a mixture liquid pipe 43 extending from the regenerator 21 is connected to the intermediate portion 123A1 in the up-and-down direction of the main body 123A. A rare absorbing liquid pipe 42 extending to the absorber 22 is connected to the lower portion 123A2 of the main body 123A, and a refrigerant pipe 34 is connected to the upper portion 123A3 of the main body 123A.

A rectifying member (separating means) 25 for separating the lubrication oil L1 and the absorbing liquid L2 is provided in the main body 123A. The rectifying member 25 is formed by using a member which can separate the lubrication oil L1 (for example, not more than 1 kg/l) and the absorbing liquid L2 (for example, not less than 1 kg/l) which are different in density, for example, a rectifying layer having a porous or mesh-like laminate layer, the mixture liquid L0 is separated into three layers of the refrigerant vapor G, the lubrication oil L1 and the absorbing liquid L2 in the main body 123 by the rectifying member 25. The rectifying member 25 is disposed at a higher position than the connection portion 123B between the main body 123A and the mixture liquid pipe 43, whereby the mixture liquid L0 from the mixture liquid pipe 43 is prevented from being mixed with the separated lubrication oil L1. The main body 123A is configured as a pressure container having an inner diameter which sufficiently enables separation of the mixture liquid L0 into the three layers of the refrigerant vapor G, the lubrication oil L1 and the absorbing liquid L2, for example, an inner diameter of 1 inch (about 2.5 cm).

The refrigerant pipe 34 penetrates through the upper portion of the main body 123A, extends to the inside of the main body 123A and has a curved portion 34B which is curved in a substantially U-shape with the tip 34A thereof placed face up. The refrigerant pipe 34 is provided so that the tip 34A thereof is located at a predetermined height H in the main body 123A. This height H is to be equal to the height of the liquid level L1A of lubrication oil L1 which is separated and held in the main body 123A when the amount of lubrication oil in the compressor 11 exceeds the amount of lubrication oil required to keep the lubrication property of the compressor 11 (FIG. 1) and the lubrication oil flows out from the compressor 11. Accordingly, when the lubrication oil L1 underruns the height H, the tip 34A of the refrigerant pipe 34 is located above the liquid level L1A of the lubrication oil L1, so that only the separated refrigerant vapor G is supplied to the compression heat pump circuit 10 (FIG. 1) through the refrigerant pipe 34. On the other hand, when the liquid level of the lubrication oil L1 is equal to the height H or more, the tip 34A of the refrigerant pipe 34 is located in the lubrication oil 11, and thus the refrigerant vapor G and the lubrication oil L1 which are separated are supplied to the compression heat pump circuit 10 through the refrigerant pipe 34.

As described above, the lubrication oil L1 and the refrigerant vapor G can be supplied to the compression heat pump circuit 10 by merely providing the curved portion 34B to the tip portion of the refrigerant pipe 34. Therefore, it is unnecessary to provide, for example, a mechanism for supplying only the lubrication oil L1 to the compression heat pump circuit 10 separately from the refrigerant vapor G, so that the construction can be simplified. Furthermore, only the refrigerant vapor G, or the lubrication oil L1 and the refrigerant vapor G can be selectively supplied to the compression heat pump circuit 10 in accordance with the height of the liquid level L1A of the lubrication oil L1 which is separated and held in the main body 123A. Therefore, as compared with a case where the lubrication oil L1 is supplied to the compression heat pump circuit 10 at all times, a loss imposed when the refrigerant vapor G is fed can be suppressed.

The absorbing liquid L2 from which the lubrication oil L1 and the refrigerant vapor G are separated is supplied to the absorber 22 through the rare absorbing liquid pipe 42. As described above, the lubrication oil L1 and the absorbing liquid L2 are separated by the separator 123, and thus the heat exchange efficiency of the absorbing liquid is not reduced.

In the above embodiment, the height H of the tip 34A is defined as the height from the upper surface 25A of the rectifying member 25 as a base height. However, the base height is not limited to that of the upper surface 25A.

As described above, according to this embodiment, the separator 123 for separating the lubrication oil for the compressor 11 and the refrigerant from the absorbing liquid of the absorption heat pump circuit 20 is provided at the exit of the regenerator 21, and the lubrication oil for the compressor 11 and the refrigerant which are separated by the separator 123 are circulated in the compression heat pump circuit 10. According to this construction, even when the lubrication oil for the compressor 11 flows out into the circuit, the lubrication oil separated from the absorbing liquid can be supplied to the compression heat pump circuit 10, so that the lubrication performance of the compressor 11 can be maintained.

Furthermore, this embodiment is configured so that the lubrication oil for the compressor 11 and the refrigerant which are separated by the separator 123 are supplied to the suction port 11A of the compressor 11 of the compression heat pump circuit 10. According to this configuration, even when the lubrication oil of the compressor 11 flows out into the circuit, the lubrication oil separated from the absorbing liquid can be surely supplied to the compressor 11, so that the lubrication performance of the compressor 11 can be surely maintained.

According to this embodiment, the separator 123 has the main body 123A in which the mixture liquid comprising the lubrication oil, the refrigerant vapor and the absorbing liquid flows from the regenerator 21, and the rectifying member 25 for separating the absorbing liquid and the lubrication oil is provided in the main body 123A so that the mixture liquid is separated into the three layers of the refrigerant vapor, the lubrication oil and the absorbing liquid. Therefore, the mixture liquid can be separated into the three layers of the absorbing liquid, the lubrication oil and the refrigerant vapor with a simple construction, and thus the lubrication oil and the refrigerant which are separated can be surely supplied to the compression heat pump circuit 10.

According to this embodiment, the mixture liquid pipe 43 to which the mixture liquid is supplied from the regenerator 21 is connected to the intermediate portion 123A1 in the up-and-down direction of the main body 123A, and the rectifying member 25 is disposed at the upper side of the connection portion 123B between the main body 123A and the mixture liquid pipe 43. According to this construction, the mixture liquid from the mixture liquid pipe 43 can be prevented from being mixed with the separated lubrication oil.

In the above construction, the refrigerant pipe 34 for supplying refrigerant to the compression heat pump circuit 10 is connected to the upper portion 123A3 of the main body 123A, and the refrigerant pipe 34 is configured to extend to the inside of the main body 123A and have a curved portion 34B which is curved in a substantially U-shape with the tip 34A thereof placed face up. According to this configuration, the lubrication oil and the refrigerant vapor can be supplied to the compression heat pump circuit 10 with a simple construction that the refrigerant pipe 34 is provided with the curved portion 34B.

The above embodiment is an example of the present invention, and it is needless to say that any proper alteration may be made without departing from the subject matter of the present invention.

For example, the refrigerant regenerated by the regenerator 21 is supplied to the suction port 11A of the compressor 11, and the compression heat pump circuit 10 and the absorption heat pump circuit 20 are disposed in series. However, the refrigerant regenerated by the regenerator 21 may be supplied to the suction side of the compressor 11, and the compression heat pump circuit 10 and the absorption heat pump circuit 20 may be disposed in parallel.

In the above embodiment, the suction-side refrigerant heat withdrawer 18 is configured as the heat exchanger for performing the heat-exchange between the refrigerant of the compression heat pump circuit 10 and the absorbing liquid of the absorption heat pump circuit 20, but the embodiment is not limited to this style. For example, the suction-side refrigerant heat withdrawer 18 may be configured as a heat exchanger for heat-exchanging the refrigerant of the compression heat pump circuit 10 with outdoor air. Furthermore, in this embodiment, the dense absorbing liquid bypass pipe 44 is branched at the downstream side of the absorbing liquid heat exchanger 24. However, the embodiment is not limited to this style, and for example, the dense absorbing liquid bypass pipe 44 may be branched between the circulation pump P and the absorbing liquid heat exchanger 24.

Furthermore, in the above embodiment, the discharge-side refrigerant heat withdrawer 19 is provided, but the discharge-side refrigerant heat withdrawer 19 may be omitted. The discharge-side refrigerant heat withdrawer 19 is provided to the dense absorbing liquid bypass pipe 44 to which the suction-side refrigerant heat withdrawer 18 is provided. However, the discharge-side refrigerant heat withdrawer 19 may be provided to another dense absorbing liquid bypass pipe branched from the dense absorbing liquid pipe 41.

Figure 8:
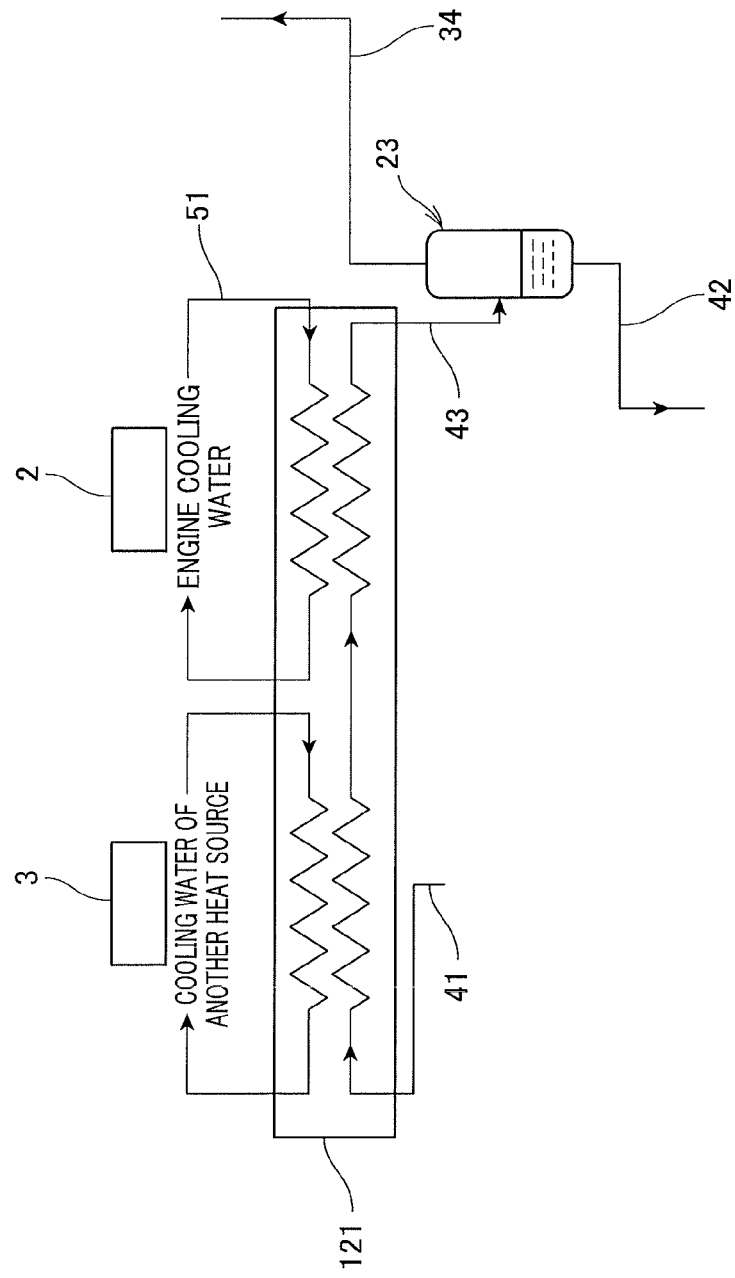
FIG. 8 is a schematic diagram showing a regenerator according to a modification of the present invention.

In the above embodiment, only the waste heat of the engine 2 is used as the heat source for the regenerator 21. However, when the waste heat of the engine 2 is insufficient, the heat of another heat source 3 which is lower in temperature than the waste heat of the engine 2 may be also used as a heat source for the regenerator 121 in addition to the waste heat of the engine 2 as shown in FIG. 8, for example.

In the above embodiment, the circulation pump P and the reverse pump R are coaxially connected to each other, and the reverse pump R is designed so that the displacement volume Vr satisfies the following equation (1) with respect to the displacement volume Vp of the circulation pump P. However, the embodiment is not limited to this style. The circulation pump P and/or the reverse pump R may be designed so that the displacement volume Vp of the circulation P and the displacement volume Vr of the reverse pump R satisfies the following equation (1).

Figure 9:
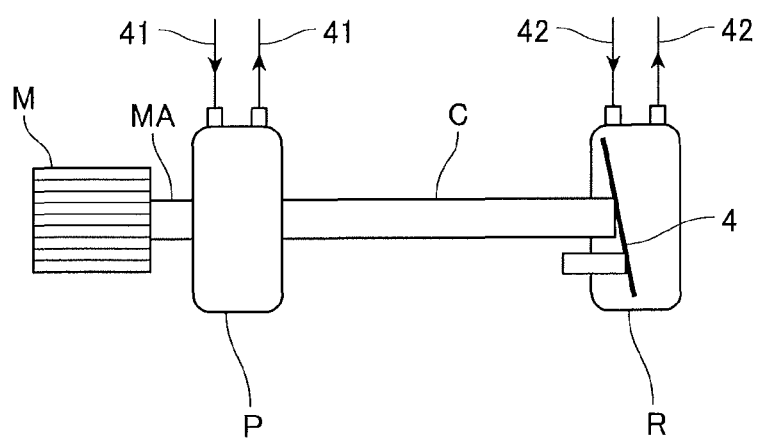
FIG. 9 is a schematic diagram showing a circulation pump and a reverse pump according to a modification of the present invention.

Furthermore, the circulation pump P and the reverse pump R may be coaxially connected to each other, and the reverse pump R may be provided with a varying mechanism 4 for making the displacement volume Vr variable so that the reverse pump R satisfies the equation (1) as shown in FIG. 9, for example. Accordingly, in the example of FIG. 9, the mass flow rate of the absorbing liquid passing through the circulation pump P is equal to the mass flow rate of the absorbing liquid passing through the reverse pump R, whereby refrigerant vapor can be prevented from flowing into the reverse pump R. Furthermore, since the circulation pump P and the reverse pump R can be coaxially connected to each other, the assembling work of the circulation pump P and the reverse pump R can be simplified.

In the example of FIG. 9, the varying mechanism 4 is provided to the reverse pump R. However, the varying mechanism 4 may be provided to the circulation pump P or provided to both the circulation pump P and the reverse pump R.

Figure 10:
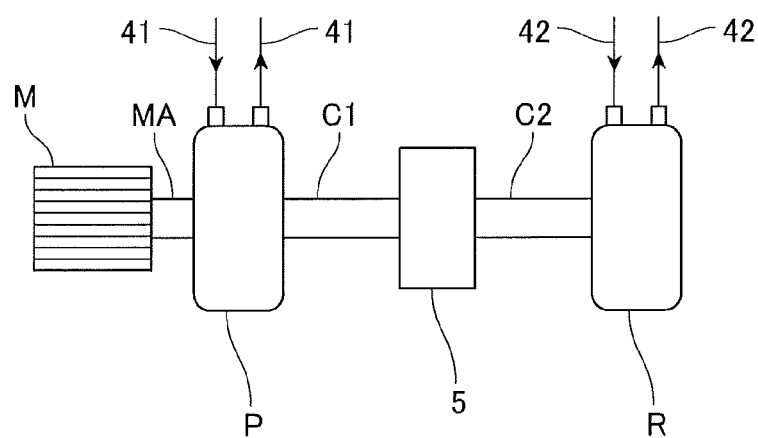
FIG. 10 is a schematic diagram showing a circulation pump and a reverse pump according to another modification of the present invention.

Furthermore, as shown in FIG. 10, the shaft (not shown) of the circulation pump P and the shaft (not shown) of the reverse pump R may be connected to each other through a transmission 5 for changing the ratio $(n_p/n_r)$ of the rotation numbers of the circulation pump P and the reverse pump R so as to satisfy the following equation (2). More specifically, the shaft of the circulation pump P and the transmission 5 are connected to each other through a circulation pump side shaft C1, and the shaft of the reverse pump R and the transmission 5 are connected to each other through a reverse pump side shaft C2.

$$V_p \times n_p \times \rho_p \times x_p = V_r \times n_r \times \rho_r \times x_r + m_{comp} \qquad (2)$$

Accordingly, in the example of FIG. 10, the mass flow rate of the absorbing liquid passing through the circulation pump P is also equal to the mass flow rate of the absorbing liquid passing through the reverse pump R, and thus the refrigerant vapor can be prevented from flowing into the reverse pump R. Furthermore, it is unnecessary to design the circulation pump P and/or the reverse pump R in conformity with the equation (1) as in the case of the example of FIG. 6, or it is unnecessary to provide the varying mechanism 4 to the circulation pump P and/or the reverse pump R as in the case of the example of FIG. 9, and thus the constructions of the circulation pump P and the reverse pump R can be simplified.

Figure 11:
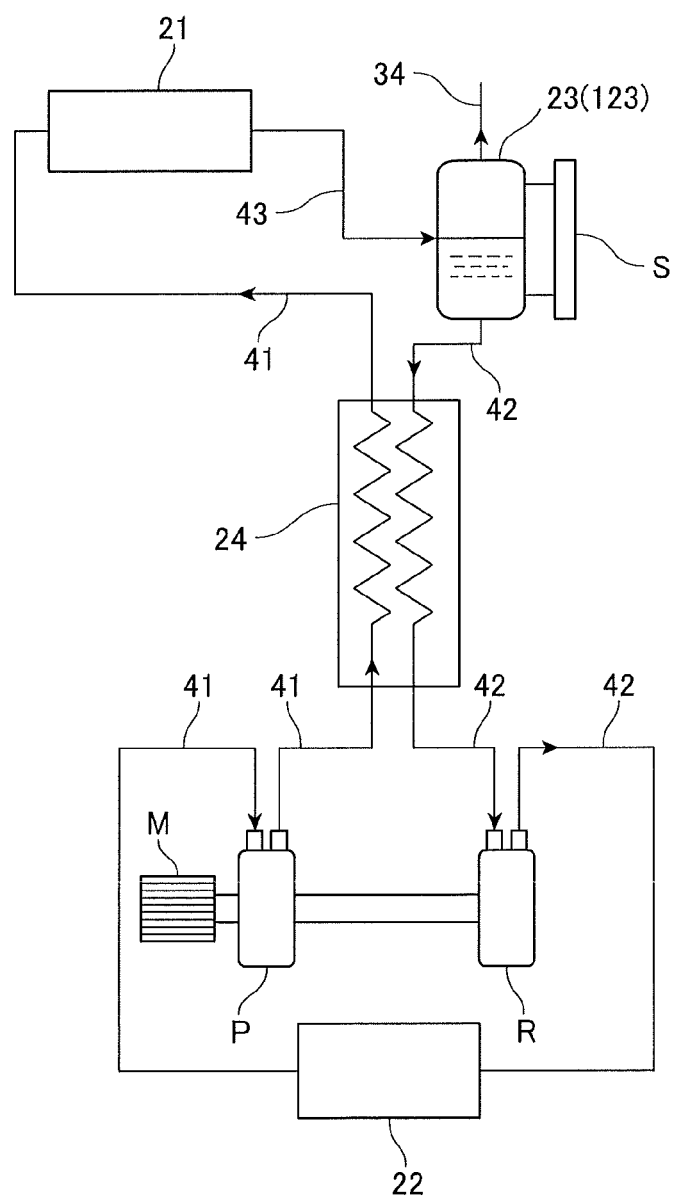
FIG. 11 is a schematic diagram showing a gas-liquid separator, a circulation pump and a reverse pump according to another modification of the present invention.

Furthermore, in the examples of FIGS. 9 and 10, a liquid level sensor S for detecting the liquid of the absorbing liquid may be provided to the gas-liquid separator 23 (or the separator 123) and the ratio of the mass flow rates of the circulation pump P and the reverse pump R (the mass flow rate of the circulation pump P/the mass flow rate of the reverse pump R) may be controlled so that the liquid level of the absorbing liquid detected by the liquid level sensor S is kept to a predetermined position as shown in FIG. 11, for example. More specifically, the ratio of the mass flow rates is controlled to increase when the liquid level of the gas-liquid separator 23 (or the separator 123) descends, and decrease when the liquid level ascends, whereby the refrigerant vapor can be prevented from flowing into the reverse pump R.

In the example of FIG. 9, in order to increase the ratio of the mass flow rates, the displacement volume of the circulation pump P is increased or the displacement volume of the reverse pump R is reduced, or both are performed. On the other hand, in order to decrease the ratio of the mass flow rates, the displacement volume of the circulation pump P is reduced or the displacement volume of the reverse pump R is increased, or both are performed.

In the example of FIG. 10, the ratio $(n_p/n_r)$ of the rotation numbers of the circulation pump P and the reverse pump R is increased to increase the ratio of the mass flow rates, and the number of the rotation numbers is reduced to reduce the ratio of the mass flow rates.

The reverse pump R may be omitted.

Figure 12:
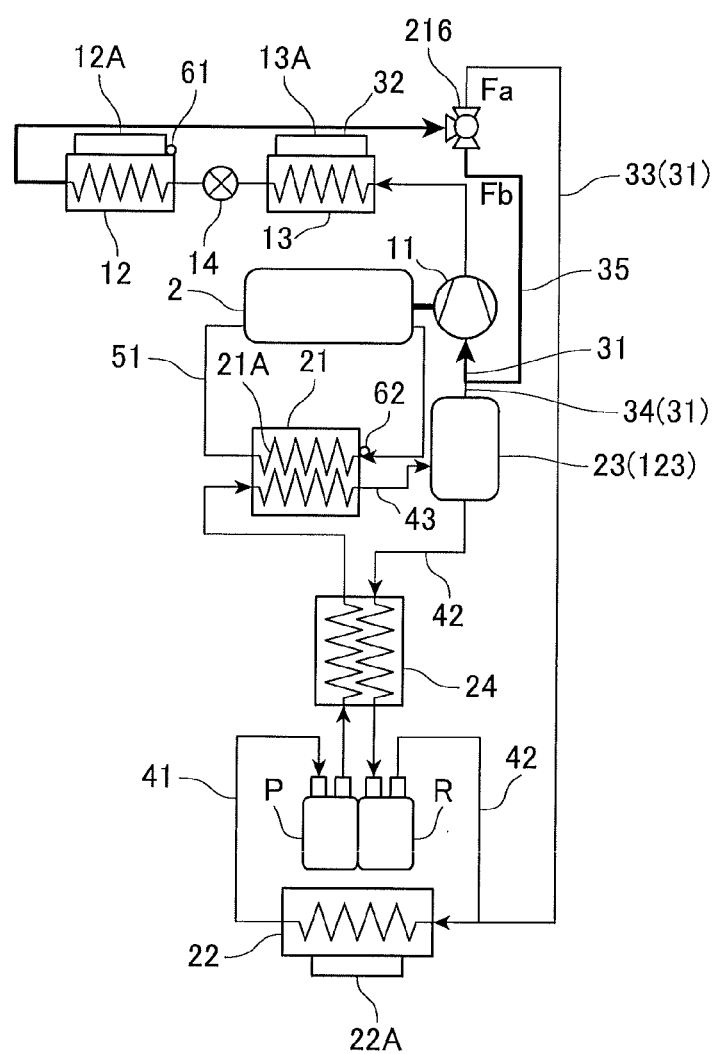
FIG. 12 is a schematic diagram showing a bypass valve according to a modification of the present invention.

In the above embodiment, the supply amount of refrigerant to the absorption heat pump circuit 20 at the start-up time of the engine 2 is controlled by providing the bypass valve 16 to the bypass pipe 35. However, the embodiment is not limited to this style. For example, the bypass valve may be provided to the refrigerant pipe 34 extending to the absorption heat pump circuit 20. The bypass valve 16 is not a flow rate control valve, but may be an opening/closing valve. For example, a three-way valve 216 may be provided at the branch point of the refrigerant pipes 33, 34 and the bypass pipe 35 as shown in FIG. 12. In the heat pump system 200 using waste heat shown in FIG. 12, the refrigerant heat exchanger 17, the suction-side refrigerant heat withdrawer 18 and the discharge-side refrigerant heat withdrawer 19 are omitted.

In the second embodiment, the refrigerant pipe 34 extends to the inside of the main body 123A, and has the curved portion 34B which is curved in a substantially U-shape with the tip 34A thereof placed face up. However, the embodiment is not limited to this style. For example, as shown in FIG. 13, a refrigerant pipe 134 may be merely connected to the upper portion 123A3 of the main body 123A, the tip 334A may be disposed at an upper portion in the main body 123A, and a lubrication oil supply mechanism 301 for supplying the separated lubrication oil L1 to the compression heat pump circuit 10, for example, the suction port 11A (FIG. 1) of the compressor 11 may be provided. The lubrication oil supply mechanism 301 is configured so that a lubrication oil pipe 302 is connected to the position of the height H, and the lubrication oil pipe 302 is provided with a pump 303 for feeding the lubrication oil L1 to the lubrication oil pipe 302. In the example of FIG. 13, when the lubrication oil of the compressor 11 flows out into the circuit, the lubrication oil separated from the absorbing liquid L2 can be supplied to the compression heat pump circuit 10, and thus the lubrication performance of the compressor 11 can be kept.

DESCRIPTION OF REFERENCE NUMERALS 1, 200 heat pump system using waste heat (heat engine-driven vapor compression heat pump system)
2 engine (power engine, heat engine)
4 varying mechanism
5 transmission
10 compression heat pump circuit
11 compressor
11A suction port
16 bypass valve
18 suction-side refrigerant heat withdrawer
19 discharge-side refrigerant heat withdrawer
20 absorption heat pump circuit
21 regenerator
22 absorber
25 rectifying member (separating means)
34 refrigerant pipe
34A tip
34B curved portion
35 bypass pipe
41 dense absorbing liquid pipe (feeding pipe)
42 rare absorbing liquid pipe (return pipe)
44 dense absorbing liquid bypass pipe (branch pipe)
60 control device (waste heat temper control means, heat capacity control means)
62 temperature sensor
70 absorbing liquid supply device (absorbing liquid supply means)
123 separator
123A main body
123B connection portion
C rotating shaft
P circulation pump
R reverse pump

The invention claimed is:
1. A heat pump system using waste heat, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, the absorption heat pump circuit has a reverse pump in a return pipe for the absorbing liquid from the regenerator to the absorber, rotational energy of the reverse pump is enabled to be withdrawn by a circulation pump for the absorbing liquid, the circulation pump and the reverse pump are equipped with a common rotating shaft, and a displacement volume $V_r$ of the reverse pump satisfies the following equation with respect to a displacement volume $V_p$ of the circulation pump:

$$V_p \times n \times \rho_p \times x_p = V_r \times n \times \rho_r \times x_r + m_{comp}$$

wherein n represents the rotation number of the rotating shaft, $\rho_p$ represents the density of absorbing liquid passing through the circulation pump, $x_p$ represents the mass concentration of the refrigerant in the absorbing liquid passing through the circulation pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump circuit.

2. A heat pump system using waste heat, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, the absorption heat pump circuit has a reverse pump in a return pipe for the absorbing liquid from the regenerator to the absorber, rotational energy of the reverse pump is enabled to be withdrawn by a circulation pump for the absorbing liquid, the circulation pump and the reverse pump are equipped with a common rotating shaft, and the circulation pump and/or the reverse pump has a varying mechanism for varying a displacement volume thereof, and the varying mechanism varies the displacement volume of the target pump so as to satisfy the following equation:

$$V_p \times n \times \rho_p \times x_p = V_r \times n \times \rho_r \times x_r + m_{comp}$$

Wherein $V_p$ represents the displacement volume of the circulation pump, n represents the rotation number of the rotating shaft, $\rho_p$ represents the density of absorbing liquid passing through the circulation pump, $x_p$ represents the mass concentration of the refrigerant in the absorbing liquid passing through the circulation pump, $V_r$ represents the displacement volume of the reverse pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump circuit.

3. A heat pump system using waste heat, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, the absorption heat pump circuit has a reverse pump in a return pipe for the absorbing liquid from the regenerator to the absorber, rotational energy of the reverse pump is enabled to be withdrawn by a circulation pump for the absorbing liquid, the circulation pump and the reverse pump are equipped with a common rotating shaft, and The reverse pump is connected to the circulation pump through a transmission that varies the ratio ($n_p/n_r$) of rotation numbers of the circulation pump and the reverse pump so as to satisfy the following equation (2):

$$V_p \times n_p \times \rho_p \times x_p = V_r \times n_r \times \rho_r \times x_r + m_{comp}$$

wherein $V_p$ represents the displacement volume of the circulation pump, $n_p$ represents the rotation number of the circulation pump, $\rho_p$ represents the density of absorbing liquid passing through the circulation pump, $x_p$ represents the mass concentration of the refrigerant in the absorbing liquid passing through the circulation pump, $V_r$ represents the displacement volume of the reverse pump, $n_r$ represents the rotation number of the reverse pump, $\rho_r$ represents the density of absorbing liquid passing through the reverse pump, $x_r$ represents the mass concentration of refrigerant in the absorbing liquid passing through the reverse pump, and $m_{comp}$ represents the circulation amount of refrigerant in the compression heat pump circuit.

4. A heat pump system using waste heat, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, and a suction-side refrigerant heat withdrawer for performing heat-exchange between refrigerant to be supplied to the compressor and absorbing liquid to be supplied to the regenerator.

5. The heat pump system using waste heats according to claim 4, wherein a branch pipe that is branched from an absorbing liquid feeding pipe from the absorber to the regenerator is provided, and the suction-side refrigerant heat withdrawer is provided to the branch pipe.

6. The heat pump system using waste heat according to claim 4, wherein a discharge-side refrigerant heat withdrawer for performing heat-exchange between refrigerant discharged from the compressor and absorbing liquid to be supplied to the regenerator is provided.

7. A heat pump system using waste heat, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, a separator for separating lubrication oil for the compressor and the refrigerant from the absorbing liquid of the absorption heat pump circuit is provided at an exit of the regenerator, the lubrication oil for the compressor and the refrigerant which are separated by the separator are circulated in the compression heat pump circuit, the lubrication oil for the compressor and the refrigerant that are separated by the separator are supplied to a suction port of the compressor of the compression heat pump circuit, and the separator has a main body in which mixture liquid comprising lubrication oil from the regenerator, refrigerant vapor and absorbing liquid flows, and separation means for separating the absorbing liquid and the lubrication oil is provided in the main body to separate the mixture liquid into three layers of the refrigerant vapor, the lubrication oil and the absorbing liquid.

8. The heat pump system using waste heat according to claim 7, wherein a mixture liquid pipe to which the mixture liquid from the regenerator is supplied is connected to an intermediate portion in an up-and-down direction of the main body, and the separating means is disposed at an upper side of a connection portion between the main body and the mixture liquid pipe.

9. The heat pump system using waste heat according to claim 7, wherein a refrigerant pipe for supplying the refrigerant to the compression heat pump circuit is connected to an upper portion of the main body, and the refrigerant pipe extends to the inside of the main body, and has a curved portion that is curved in a substantially U-shape with the tip thereof placed face up.

10. A heat engine-driven vapor compression heat pump system, comprising:
a compression heat pump circuit using a shaft output of a power engine as a power source for a compressor that compresses refrigerant; and
an absorption heat pump circuit using waste heat of the power engine as a heat source for a regenerator that heats absorbing liquid, wherein refrigerant vaporized in the compression heat pump circuit is circulated to an absorber of the absorption heat pump circuit, the refrigerant is separated after regenerated by the regenerator, the separated refrigerant is circulated into the compression heat pump circuit, refrigerant regenerated by the regenerator of the absorption heat pump circuit is supplied to a suction port of the compressor of the compression heat pump circuit, a temperature sensor for detecting the temperature of waste heat to be supplied to the regenerator and waste heat temperature control means for controlling a circulation pump for the absorbing liquid so that the temperature of the waste heat detected by the temperature sensor is kept to a predetermined temperature are provided, a bypass pipe through which refrigerant vaporized in the compression heat pump circuit bypasses the absorption heat pump circuit and is supplied to a suction port of the compressor is provided, a bypass valve for controlling a refrigerant amount is provided to the bypass pipe, and the waste heat temperature control means controls the bypass valve on the basis of the temperature of the waste heats detected by the temperature sensor.

11. The heat engine-driven vapor compression heat pump system according to claim 10, wherein heat capacity amount control means for controlling heat capacity of cold heat or hot heat to be supplied from a user-side heat exchanger of the compression heat pump circuit to a thermal load is provided, and the heat capacity control means reduces an input variation of a power source of the power engine by only the amount corresponding to a capacity contribution rate of the absorption heat pump circuit to the whole capacity of the heat engine-driven vapor compression heat pump system.

12. The heat pump system using waste heat according to claim 5, wherein a discharge-side refrigerant heat withdrawer for performing heat-exchange between refrigerant discharged from the compressor and absorbing liquid to be supplied to the regenerator is provided.

13. The heat pump system using waste heat according to claim 8, wherein a refrigerant pipe for supplying the refrigerant to the compression heat pump circuit is connected to an upper portion of the main body, and the refrigerant pipe extends to the inside of the main body, and has a curved portion that is curved in a substantially U-shape with the tip thereof placed face up.

* * * * *